(12) United States Patent
Hansen et al.

(10) Patent No.: US 11,996,526 B2
(45) Date of Patent: May 28, 2024

(54) HIGH-POWER BATTERY-POWERED PORTABLE POWER SOURCE

(71) Applicant: MILWAUKEE ELECTRIC TOOL CORPORATION, Brookfield, WI (US)

(72) Inventors: Dalton F. Hansen, Whitefish Bay, WI (US); Duane W. Wenzel, Waukesha, WI (US); Emily C. Doberstein, San Diego, CA (US); Amanda M. Kachar, West Allis, WI (US); Dean W. Nowalis, Franklin, WI (US); Michael A. Matthews, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 458 days.

(21) Appl. No.: 17/410,379

(22) Filed: Aug. 24, 2021

(65) Prior Publication Data

US 2021/0384737 A1 Dec. 9, 2021

Related U.S. Application Data

(62) Division of application No. 16/363,793, filed on Mar. 25, 2019, now Pat. No. 11,114,878.

(Continued)

(51) Int. Cl.
*H01M 10/46* (2006.01)
*H01M 10/42* (2006.01)
(Continued)

(52) U.S. Cl.
CPC ......... *H01M 10/46* (2013.01); *H01M 10/425* (2013.01); *H01M 10/488* (2013.01);
(Continued)

(58) Field of Classification Search
CPC ...... H02J 7/0045; H02J 7/0042; H02J 7/0025; H02J 7/0044; H02J 2207/20; H01M 10/46;
(Continued)

(56) References Cited

U.S. PATENT DOCUMENTS 5,111,127 A 5/1992 Johnson
5,350,317 A 9/1994 Weaver et al.
(Continued)

FOREIGN PATENT DOCUMENTS

CN 1009691 B 9/1990
CN 2153167 Y 1/1994
(Continued)

OTHER PUBLICATIONS

Chinese Patent Office Action for Application No. 201980022519.0 dated Sep. 11, 2023 (19 pages including machine English translation).

(Continued)

*Primary Examiner* — Edward Tso
(74) *Attorney, Agent, or Firm* — Michael Best & Friedrich LLP

(57) ABSTRACT

A portable power source for power tools. The portable power source includes a housing defining a battery support and an power outlet, a circuit supported by the housing and including an input terminal on the battery support, an output terminal on the power outlet, and an inverter electrically connected between the input terminal and the output terminal, a battery power source including a battery housing supported on the battery support, at least one battery cell, and a battery terminal connected to the battery cell and electrically connectable to the input terminal, power being transferrable from the battery cell to the circuit to be output through the power outlet, and a frame connected to the (Continued)

housing and extending beyond a periphery of the housing and of the supported battery power source, the frame inhibiting contact with the housing and the battery power source.

20 Claims, 16 Drawing Sheets

Related U.S. Application Data

(60) Provisional application No. 62/648,276, filed on Mar. 26, 2018.

(51) Int. Cl.
    *H01M 10/48*      (2006.01)
    *H01M 50/204*      (2021.01)
    *H01M 50/247*      (2021.01)
    *H01M 50/256*      (2021.01)
    *H01M 50/264*      (2021.01)
    *H01M 50/296*      (2021.01)
    *H02J 7/00*      (2006.01)
    *H01M 50/576*      (2021.01)

(52) U.S. Cl.
    CPC ....... *H01M 50/204* (2021.01); *H01M 50/247* (2021.01); *H01M 50/256* (2021.01); *H01M 50/264* (2021.01); *H01M 50/296* (2021.01); *H02J 7/0025* (2020.01); *H02J 7/0042* (2013.01); *H02J 7/0044* (2013.01); *H02J 7/0045* (2013.01); *H01M 50/576* (2021.01); *H01M 2220/30* (2013.01); *H02J 2207/20* (2020.01)

(58) Field of Classification Search
    CPC ............. H01M 10/425; H01M 10/488; H01M 2220/30; H01M 50/576; H01M 50/247; H01M 50/204; H01M 50/296; H01M 50/264; H01M 50/256
    USPC .......................................... 320/107, 114, 115
    See application file for complete search history.

(56) References Cited

U.S. PATENT DOCUMENTS

| | | |
|---|---|---|
| 5,493,197 A | 2/1996 | Eguchi et al. |
| 5,493,297 A | 2/1996 | Nguyen et al. |
| 5,631,533 A | 5/1997 | Imaseki |
| 5,739,669 A | 4/1998 | Brülhardt et al. |
| 5,742,148 A | 4/1998 | Sudo et al. |
| 5,744,936 A | 4/1998 | Kawakami |
| 5,841,265 A | 11/1998 | Sudo et al. |
| 5,910,723 A | 6/1999 | Perelle |
| 5,952,815 A | 9/1999 | Rouillard et al. |
| 5,982,138 A | 11/1999 | Krieger |
| 5,982,150 A | 11/1999 | Sudo et al. |
| 5,998,969 A | 12/1999 | Tsuji et al. |
| 5,998,974 A | 12/1999 | Sudo et al. |
| 6,014,013 A | 1/2000 | Suppanz et al. |
| 6,054,841 A | 4/2000 | Sudo et al. |
| 6,075,343 A | 6/2000 | Hsu |
| 6,087,807 A | 7/2000 | Sudo et al. |
| 6,097,177 A | 8/2000 | Sudo et al. |
| 6,104,162 A | 8/2000 | Sainsbury et al. |
| 6,121,752 A | 9/2000 | Kitahara et al. |
| 6,127,808 A | 10/2000 | Sudo et al. |
| 6,181,108 B1 | 1/2001 | Sudo et al. |
| 6,211,650 B1 | 4/2001 | Mumaw et al. |
| 6,242,890 B1 | 6/2001 | Sudo et al. |
| 6,262,561 B1 | 7/2001 | Takahashi et al. |
| 6,268,711 B1 | 7/2001 | Bearfield |
| 6,377,023 B1 | 4/2002 | Capel |
| 6,403,251 B1 | 6/2002 | Baggaley et al. |
| 6,579,215 B2 | 6/2003 | Katoh et al. |
| 6,683,439 B2 | 1/2004 | Takano et al. |
| 6,762,588 B2 | 7/2004 | Miyazaki et al. |
| 6,806,680 B2 | 10/2004 | Zeiler |
| 7,105,940 B2 | 9/2006 | Weesner et al. |
| 7,180,200 B2 | 2/2007 | Walter et al. |
| 7,190,841 B2 | 3/2007 | Takahashi |
| 7,247,954 B1 | 7/2007 | Dowdle |
| 7,336,054 B2 | 2/2008 | Crisp et al. |
| 7,626,356 B2 | 12/2009 | Elgie et al. |
| 7,667,341 B2 | 2/2010 | Serdynski et al. |
| 7,781,902 B2 | 8/2010 | Cerney et al. |
| 7,898,212 B2 | 3/2011 | Benn et al. |
| 7,992,852 B2 | 8/2011 | Marineau et al. |
| 8,080,972 B2 | 12/2011 | Smith et al. |
| 8,159,078 B2 | 4/2012 | Usselman et al. |
| 8,198,759 B2 | 6/2012 | Hurst et al. |
| 8,672,649 B2 | 3/2014 | Smith et al. |
| 8,994,336 B2 | 3/2015 | Brotto et al. |
| 9,024,570 B2 | 5/2015 | Workman et al. |
| 9,166,422 B2 | 10/2015 | Brotto et al. |
| 9,312,706 B2 | 4/2016 | Workman et al. |
| 9,344,008 B2 | 5/2016 | Brotto et al. |
| 9,385,351 B2 | 7/2016 | Workman et al. |
| 9,388,953 B2 | 7/2016 | Workman et al. |
| 9,430,370 B2 | 8/2016 | Mergener |
| 9,467,862 B2 | 10/2016 | Zeiler et al. |
| 9,515,500 B2 | 12/2016 | Workman et al. |
| 9,525,293 B2 | 12/2016 | Ito et al. |
| 9,531,199 B2 | 12/2016 | Miller et al. |
| 9,553,481 B2 | 1/2017 | Prommel et al. |
| 9,583,748 B2 | 2/2017 | Choi et al. |
| 9,643,506 B2 | 5/2017 | Lei |
| 9,899,853 B2 | 2/2018 | Marinov et al. |
| 9,991,737 B2 | 6/2018 | Mueckl et al. |
| 10,044,243 B2 | 8/2018 | Janscha et al. |
| D828,301 S | 9/2018 | Wang |
| D834,517 S | 11/2018 | Fritz et al. |
| 10,184,349 B2 | 1/2019 | Schulte |
| 10,190,223 B2 | 1/2019 | Lin |
| 10,273,864 B2 | 4/2019 | Takahashi et al. |
| 10,288,251 B2 | 5/2019 | Mestre et al. |
| 10,294,858 B2 | 5/2019 | Lan et al. |
| 10,308,358 B2 | 6/2019 | Phan et al. |
| 10,319,207 B1 | 6/2019 | Janscha et al. |
| 10,361,606 B2 | 7/2019 | Sautier et al. |
| 10,385,463 B2 | 8/2019 | Lin |
| 10,408,115 B2 | 9/2019 | Okada et al. |
| 10,439,463 B2 | 10/2019 | Allen et al. |
| 10,465,300 B2 | 11/2019 | Lin |
| 10,488,169 B2 | 11/2019 | Rastegar et al. |
| 10,495,186 B2 | 12/2019 | Lemmers, Jr. |
| 10,516,321 B2 | 12/2019 | Kobayashi |
| 10,523,092 B2 | 12/2019 | Akamatsu et al. |
| D875,943 S | 2/2020 | Dayton et al. |
| D878,293 S | 3/2020 | Beyerlein et al. |
| D879,037 S | 3/2020 | Simon et al. |
| D879,717 S | 3/2020 | Simon et al. |
| D887,005 S | 6/2020 | Lin |
| 10,811,885 B2 | 10/2020 | Fry et al. |
| D910,560 S | 2/2021 | Inskeep et al. |
| D913,226 S | 3/2021 | Tachibana et al. |
| D913,920 S | 3/2021 | Tachibana et al. |
| D920,243 S | 5/2021 | Tachibana et al. |
| D920,244 S | 5/2021 | Tachibana et al. |
| D920,909 S | 6/2021 | Sakamura et al. |
| D922,950 S | 6/2021 | Tachibana et al. |
| D928,708 S | 8/2021 | Kato et al. |
| D929,937 S | 9/2021 | Zhang et al. |
| D929,940 S | 9/2021 | Kato et al. |
| D932,430 S | 10/2021 | Li et al. |
| D932,518 S | 10/2021 | Tomczak et al. |
| D933,010 S | 10/2021 | Hansen et al. |
| 11,444,464 B1 * | 9/2022 | Ford .................. G05B 19/0426 |
| 2001/0004198 A1 | 6/2001 | Matsuyama |
| 2001/0054878 A1 | 12/2001 | Odaohhara |
| 2002/0011820 A1 | 1/2002 | Suzuki et al. |
| 2002/0011822 A1 | 1/2002 | Sakai et al. |
| 2002/0089306 A1 | 7/2002 | Kubale et al. |

(56) References Cited

U.S. PATENT DOCUMENTS

| | | |
|---|---|---|
| 2002/0124192 A1 | 9/2002 | Odaohhara |
| 2003/0044689 A1 | 3/2003 | Miyazaki et al. |
| 2003/0227275 A1 | 12/2003 | Kishi et al. |
| 2004/0001996 A1 | 1/2004 | Sugimoto |
| 2004/0217737 A1 | 11/2004 | Popescu |
| 2005/0024021 A1 | 2/2005 | Zeiler et al. |
| 2005/0044051 A1 | 2/2005 | Selby et al. |
| 2005/0073282 A1 | 4/2005 | Carrier et al. |
| 2005/0077878 A1 | 4/2005 | Carrier et al. |
| 2005/0093514 A1 | 5/2005 | Shimizu |
| 2005/0156564 A1 | 7/2005 | Krieger |
| 2005/0226020 A1 | 10/2005 | Asbery |
| 2005/0280393 A1 | 12/2005 | Feldmann |
| 2006/0014054 A1 | 1/2006 | Sugawara |
| 2006/0108984 A1 | 5/2006 | Johnson et al. |
| 2006/0158037 A1 | 7/2006 | Danley et al. |
| 2006/0286442 A1 | 12/2006 | Flaugher |
| 2007/0019453 A1 | 1/2007 | Pierce |
| 2007/0080586 A1 | 4/2007 | Busick |
| 2007/0128505 A9 | 6/2007 | Yahnker et al. |
| 2007/0285055 A1 | 12/2007 | Meyer et al. |
| 2008/0003491 A1 | 1/2008 | Yahnker et al. |
| 2008/0116748 A1 | 5/2008 | Yeh |
| 2008/0180059 A1 | 7/2008 | Carrier et al. |
| 2008/0203995 A1 | 8/2008 | Carrier et al. |
| 2009/0014050 A1 | 1/2009 | Haaf |
| 2009/0140694 A1 | 6/2009 | Zeng |
| 2009/0146614 A1 | 6/2009 | Carrier et al. |
| 2010/0181966 A1 | 6/2010 | Sakakibara |
| 2012/0007446 A1 | 1/2012 | Ro |
| 2012/0025766 A1 | 2/2012 | Reade et al. |
| 2012/0038171 A1* | 2/2012 | Lim .................. F02B 63/04 290/1 A |
| 2012/0202094 A1 | 8/2012 | Sada |
| 2012/0313431 A1 | 12/2012 | Shum et al. |
| 2013/0043826 A1 | 2/2013 | Workman et al. |
| 2013/0057074 A1 | 3/2013 | Takano |
| 2014/0017528 A1 | 1/2014 | Uehara et al. |
| 2014/0040932 A1 | 2/2014 | Gates, III et al. |
| 2014/0042975 A1 | 2/2014 | Miller et al. |
| 2014/0107853 A1 | 4/2014 | Ashinghurst et al. |
| 2014/0232343 A1 | 8/2014 | Tadd et al. |
| 2014/0287273 A1 | 9/2014 | Nguyen et al. |
| 2015/0171632 A1 | 6/2015 | Fry et al. |
| 2015/0226021 A1 | 8/2015 | Zhang et al. |
| 2016/0056731 A1 | 2/2016 | Brotto et al. |
| 2016/0099575 A1 | 4/2016 | Velderman et al. |
| 2016/0198636 A1 | 7/2016 | Poole et al. |
| 2016/0261114 A1 | 9/2016 | Brotto et al. |
| 2017/0040801 A1 | 2/2017 | Robinson et al. |
| 2017/0047755 A1 | 2/2017 | Workman et al. |
| 2017/0077724 A1 | 3/2017 | Clark |
| 2017/0346321 A1 | 11/2017 | Lemberg |
| 2018/0090957 A1 | 3/2018 | Rao |
| 2019/0075665 A1 | 3/2019 | Choksi et al. |
| 2019/0103805 A1 | 4/2019 | Zhu et al. |
| 2019/0109478 A1 | 4/2019 | Zhu et al. |

FOREIGN PATENT DOCUMENTS

| | | |
|---|---|---|
| CN | 2159081 Y | 3/1994 |
| CN | 2198706 Y | 5/1995 |
| CN | 2384366 Y | 6/2000 |
| CN | 2421774 Y | 2/2001 |
| CN | 1367565 A | 9/2002 |
| CN | 1402375 A | 3/2003 |
| CN | 1567645 A | 1/2005 |
| CN | 2672886 Y | 1/2005 |
| CN | 2676428 Y | 2/2005 |
| CN | 1622423 A | 6/2005 |
| CN | 1655416 A | 8/2005 |
| CN | 1972004 A | 5/2007 |
| CN | 202798104 U | 3/2013 |
| CN | 203554047 U | 4/2014 |
| CN | 104065114 A | 9/2014 |
| CN | 105593514 A | 5/2016 |
| CN | 105720624 A | 6/2016 |
| DE | 8223987 U1 | 11/1982 |
| DE | 3700092 A1 | 7/1988 |
| DE | 19545833 A1 | 6/1997 |
| DE | 19705192 A1 | 10/1997 |
| DE | 10138983 A1 | 2/2003 |
| GB | 2312571 A | 10/1997 |
| GB | 2349518 A | 11/2000 |
| JP | H0458470 A | 2/1992 |
| JP | H04105521 A | 4/1992 |
| JP | H08191547 A | 7/1996 |
| JP | H0928042 A | 1/1997 |
| JP | H0974689 A | 3/1997 |
| JP | H11234917 A | 8/1999 |
| JP | 2001157367 A | 6/2001 |
| JP | 2002247777 A | 8/2002 |
| JP | 2002281685 A | 9/2002 |
| JP | 2003061257 A | 2/2003 |
| JP | 2005150079 A | 6/2005 |
| JP | 2006050785 A | 2/2006 |
| JP | 2006254535 A | 9/2006 |
| WO | 1996017397 A1 | 6/1996 |
| WO | 1998039831 A1 | 9/1998 |
| WO | 1999025053 A1 | 5/1999 |
| WO | 2005091461 A1 | 9/2005 |
| WO | 2008010801 A2 | 1/2008 |
| WO | 2017118922 A1 | 7/2017 |
| WO | 2018067435 A1 | 4/2018 |

OTHER PUBLICATIONS

Champion Power Equipment, "Champion Power Equipment 100813 9375/7500-Watt Portable Generator with Electric Start," <http://www.amazon.com/Champion-7500-Watt-Portable-Generator-Electric/dp/B0812DHXJH?th=1> web page publicly available at least as early as Jan. 7, 2022.

Northern Tool, "Powerhorse Portable Generator—11,050 Surge Watts, 8400 Rated Watts, Electric Start," <https://www.northerntool.com/shop/tools/product_200913128_200913128> web page publicly available at least as early as Jan. 7, 2022.

Northern Tool, "Generac Portable Generator—10,000 Surge Watts, 8000 Rated Watts, Electric Start, Model# 7686," <https://www.northerntool.com/shop/tools/product_200736934_200736934> web page publicly available at least as early as Jan. 7, 2022.

Document depicting images of portable generators, compiled and cited by the Patent Examiner as non-patent literature in Design U.S. Appl. No. 29/803,187, dated Jan. 7, 2022 (60 pages including statement of relevance).

International Partial Search Report and Invivtation to Pay Additional Fees for Application No. PCT/US/2019/023908 dated Jun. 11, 2019, 16 pages.

International Search Report for International Application No. PCT/US2019/023908 dated Aug. 2, 2019, 9 pages.

Written Opinion for International Application No. PCT/US2019/023908 dated Aug. 2, 2019, 15 pages.

DeWalt 1800 Watt Portable Power Station DCB1800, YouTube video available at <https://www.youtube.com/watch?v=-GiL2vmCB6g> accessed on Sep. 30, 2019.

DeWalt Portable Power Station & Charger—DCB1800, YouTube video available at <https://www.youtube.com/watch?v=8w-uMmkJ2KE> accessed on Sep. 30, 2019.

DeWalt Portable Power Station & 60v and 20V Charger DCB1800—First Look, YouTube video available at <https://www.youtube.com/watch?v=mPE32YCwJJA> accessed Sep. 30, 2019.

DeWalt 1800 Portable Power Station and Charger Documentation, tool was publicly available as early as Jul. 30, 2018 (37 pages).

DeWalt, "DCB1800 1800 Watt Portable Power Station with Parallel Battery Charger," Instruction Manual © 2016 (36 pages).

DeWalt 1800 Watt Portable Power Station Testing—DCB1800, YouTube video available at <https://www.youtube.com/watch?v=TDTw95y8-4c> accessed May 7, 2021.

(56) References Cited

OTHER PUBLICATIONS

Chinese Patent Office Action for Application No. 201980022519.0 dated Jun. 21, 2022 (11 pages including statement of relevance).

* cited by examiner

HIGH-POWER BATTERY-POWERED PORTABLE POWER SOURCE

CROSS-REFERENCE TO RELATED APPLICATION

This application is a division of U.S. patent application Ser. No. 16/363,793, filed on Mar. 25, 2019, now U.S. Pat. No. 11,114,878, which claims priority to U.S. Provisional Patent Application No. 62/648,276, filed on Mar. 26, 2018, the entire contents of each of which are hereby incorporated by reference.

FIELD OF INVENTION

The present invention relates to battery-powered portable power sources and, more particularly, to such portable power sources powered by high-power battery packs.

BACKGROUND

Users of power tools, outdoor tools, other powered equipment utilize a wide range of corded, AC products every day. These products include low-powered to high-powered tools and equipment, variable speed tools, and chargers for cordless batteries (referred to as "corded devices" or a "corded device"). These corded devices often do not have a suitable cordless option available. Even when cordless options are available, users may still prefer the corded devices, for example, due to additional costs associated with cordless solutions, because the users do not believe that cordless solutions can provide the performance, run-time, etc., needed to complete heavier-duty applications, etc.

In some situations, power or sufficient power may not be available at a worksite, or available power may be unreliable or insufficient for the corded device applications. Such scenarios may force the user to obtain power from distant locations where reliable power is available (e.g., through extension cords) or to utilize fuel-based power generators (which may be heavy and loud).

In some cases, the worksite may be enclosed or have inadequate ventilation inhibiting use of a generator due to the emissions from the generator. In these situations, the user may need to run a long extension cord that can decrease the performance and life of the corded, AC products. This may result in decreases in productivity, continual inconvenience, an overall poor user experience, etc.

Accordingly, there may be a need for non-fuel based portable power sources that are reliable and can provide high power for extended periods of time for corded device applications.

SUMMARY

In one independent aspect, a portable power source may generally include a housing defining a battery support and an AC power outlet, a circuit supported by the housing and including an input terminal on the battery support, an output terminal on the power outlet, and an inverter electrically connected between the input terminal and the output terminal, a battery power source including a battery housing supported on the battery support, at least one battery cell, and a battery terminal connected to the battery cell and electrically connectable to the input terminal, power being transferrable from the battery cell to the circuit to be output through the AC power outlet, and a frame connected to the housing and extending beyond a periphery of the housing and of the supported battery power source.

In a further independent aspect, a portable power source may generally include a housing supportable relative to a support surface, the housing having a lower surface facing the support surface and an upper surface facing away from the lower surface, the housing including a first battery support on the lower surface, a second battery support on the upper and an AC power outlet, a circuit supported by the housing and including a first input terminal on the first battery support, a second input terminal on the second battery support, and an output terminal on the power outlet, and an inverter electrically connected between the input terminals and the output terminal, a first battery pack supportable on the first battery support, and a second battery pack supportable on the second battery support, each battery pack including a battery housing supported on the associated battery support, at least one battery cell, and a battery terminal connected to the battery cell and electrically connectable to the associated input terminal, power being transferrable from the battery cell of each battery pack to the circuit to be output through the AC power outlet.

In yet another independent aspect, a portable power source may generally include a housing defining a battery support and an AC power outlet, a circuit supported by the housing and including an input terminal on the battery support, an output terminal on the power outlet, and an inverter electrically connected between the input terminal and the output terminal, a battery power source including a battery housing supported on the battery support, at least one battery cell, and a battery terminal connected to the battery cell and electrically connectable to the input terminal, power being transferrable from the battery cell to the circuit to be output through the AC power outlet, and fuel gauge operable to display a state-of-charge of the battery power source, the fuel gauge and the power outlet being positioned on a side of the housing.

Other independent aspects of the invention may become apparent by consideration of the detailed description and accompanying drawings.

DETAILED DESCRIPTION

Figure 1:
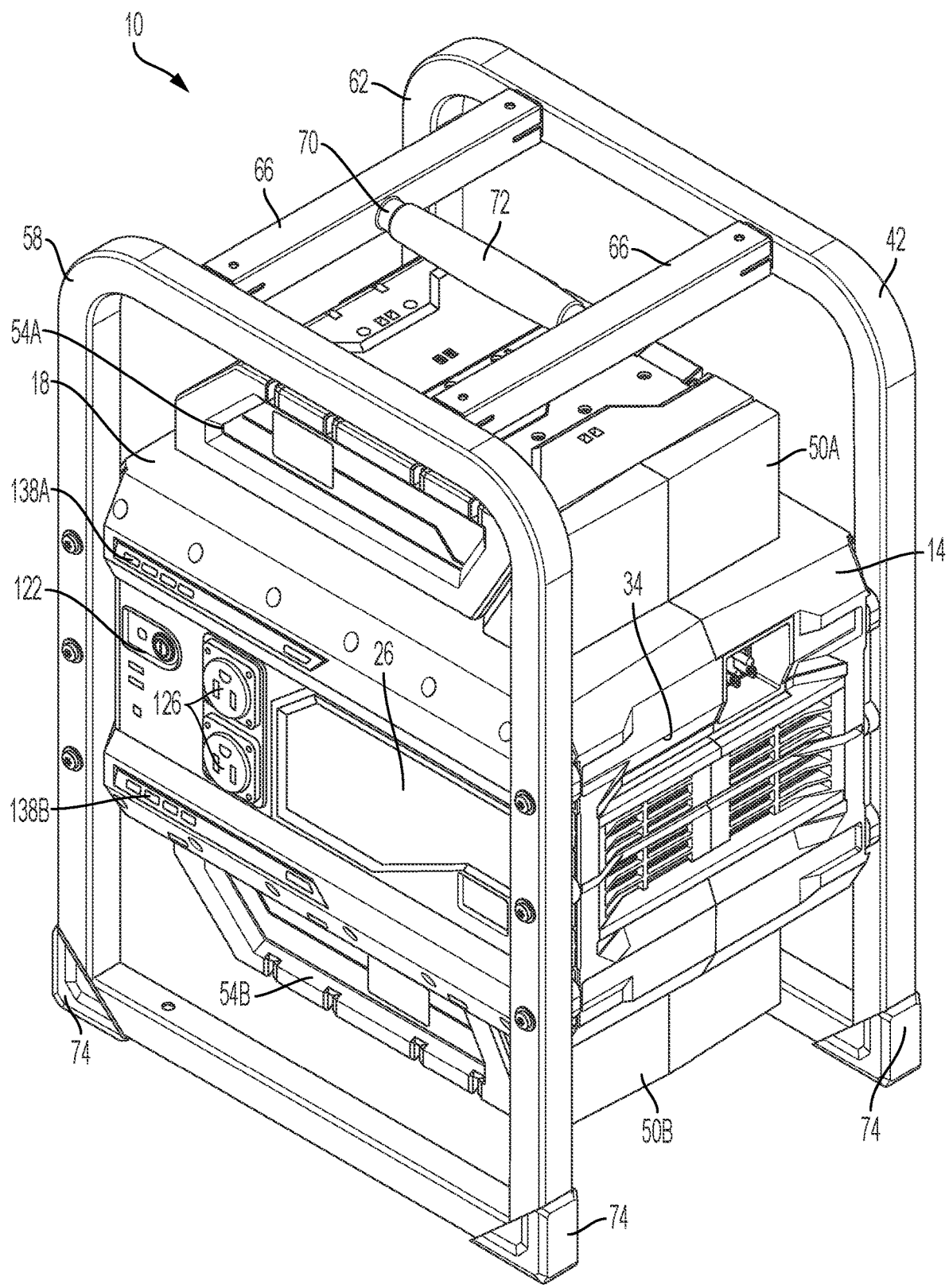
FIG. 1 is a perspective view of a portable power source, such as a battery-powered portable power source.
Figure 2:
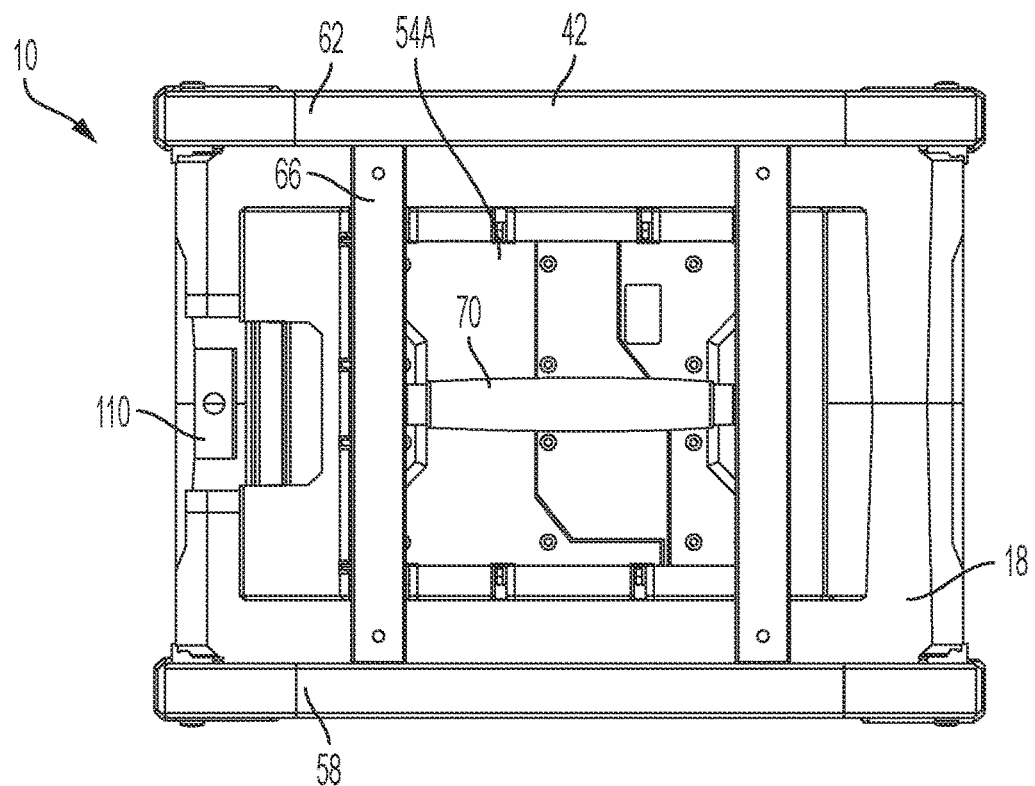
FIG. 2 is a top plan view of the portable power source of FIG. 1.
Figure 3:
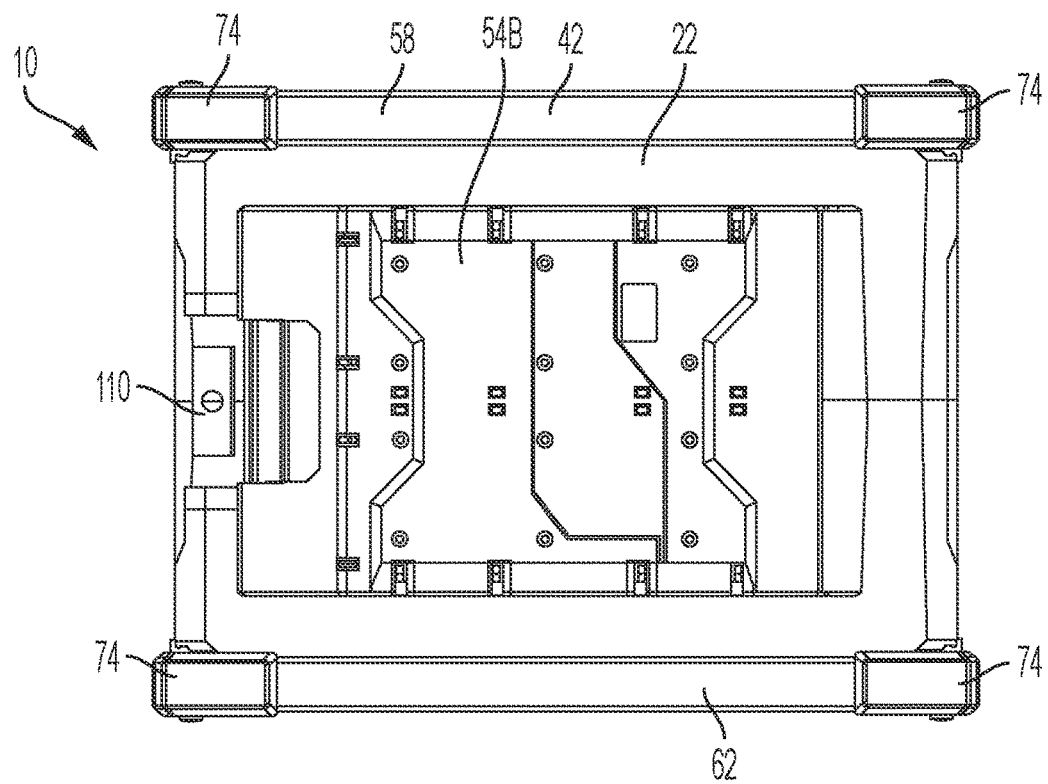
FIG. 3 is a bottom plan view of the portable power source of FIG. 1.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

FIGS. 1-7 illustrate a portable power source 10 according to an embodiment of the invention. The illustrated portable power source 10 is powered by one or more high power battery packs 54 (e.g., two battery packs 54A, 54B illustrated) and is operable to power different corded devices, such as power tools, outdoor tools, other powered equipment (e.g., lights, chargers for cordless batteries, etc.).

The battery packs 54 may include one or more cells strings, each having a number (e.g., 20) of battery cells connected in series to provide a desired discharge output (e.g., a nominal voltage (e.g., 20 V, 40 V, 60 V, 80 V, 120 V) and current capacity). The battery packs 54 may include a number of cell strings connected in parallel (e.g., a single cell string "20S1P", two cell strings "20S2P", three cell strings "20S3P", etc.). In other embodiments, other combinations (series, parallel, combination series-parallel configurations) of battery cells are also possible.

Each battery cell may have a nominal voltage between 3 V and 5 V and a nominal capacity between 3 Ah and 5 Ah. The battery cells may be any rechargeable battery cell chemistry type, such as, for example Lithium (Li), Lithium-ion (Li-ion), other Lithium-based chemistry, Nickel-Cadmium (NiCd), Nickel-metal Hydride (NiMH), etc.

Similar battery packs 54 are described and illustrated in U.S. Provisional Application No. 62/527,735, filed Jun. 30, 2017, entitled "HIGH-POWER BATTERY-POWERED SYSTEM," the entire contents of which are hereby incorporated by reference.

The weight of a single "20S1P" configuration battery pack 54 is approximately (2.7 kgs) 6 lbs. The weight of a single "20S2P" configuration battery pack 54 is approximately (5 kgs) 11 lbs. The weight of a single "20S3P" configuration battery pack 54 is within a range of approximately (6.8 kgs) 15 lbs. to approximately (9.1 kgs) 20 lbs. In some embodiments, the weight of a single "20S3P" configuration battery pack 54 is approximately (8.1 kgs) 18 lbs.

The illustrated portable power source 10 includes a housing 14 having a top 18, a bottom 22, a front 26, a rear 30, and opposite sides 34, 38. A roll cage 42 (for example, a frame) is fixed to the housing 14 to, for example, provide protection for and enable handling of the portable power source 10. The roll cage 42 inhibits contact with the housing 14 and the battery packs 54 (for example, battery power source). As shown, the roll cage 42 is fixed to the front 26 and rear 30 of the housing 14 with fasteners 46. In some embodiments, the roll cage 42 may be fixed to other sides of the housing 14.

A battery support 50 is provided for each battery pack 54. In the illustrated construction, the first battery support 50A is provided on the top 18 of the housing 10 and supports the first battery pack 54A; the second battery support 50B is provided on the bottom 22 of the housing 10 and supports the second battery pack 54B.

The roll cage 42 includes first and second frame portions 58, 62 fixed to the front 26 and rear 30 of the housing 14, respectively, and a pair of spaced apart horizontal bars 66 connecting the frame portions 58, 62 on the top 18. The roll cage 42 is made of hollow metal bars having, for example, a rectangular or round cross-section.

The structure of the roll cage 42 prevents the battery packs 54 and the housing 14 from absorbing any impact during a drop event. The roll cage 42 absorbs the impact and can withstand a drop from up to 4 ft. above the ground. In some embodiments, the roll cage 42 can absorb 220 J of impact energy from a drop event.

The frame portions 58, 62 extend beyond the outer periphery of the housing 14 on each side 18-38. Particularly, the frame portions 58, 62 extend above the first battery support 50A and the supported first battery pack 54A on the top 18 and extend below the second battery support 50B and the supported second battery pack 54B on the bottom 22.

A carry handle 70 connects and is substantially perpendicular to the horizontal bars 66. The handle 70 is parallel to the frame portions 58, 62. The handle 70 includes a grip portion 72, which may include elastomeric material to improve gripping, comfort of a user during movement of the portable power source 10. Rubber feet 74 are fixed on a bottom of the frame portions 58, 62 (e.g., covering the corners). The rubber feet 74 provide a non-slip, non-scratch surface when the portable power source 10 is placed on a surface, such as a floor at a work site.

In the illustrated construction, the housing 14 is not vertically centered on the frame portions 58, 62. The center of the housing 14 is positioned below the vertical center of the frame portions 58, 62 to provide a low center of gravity for the portable power source 10 as described in further detail below. The frame portions 58, 62 extend farther beyond the top 18 than the bottom 22. This positioning also spaces the handle 70 from the upper-most portion of the supported first battery pack 54A to allow a user's hand to fit between the handle 70 and the first battery pack 54B.

Figure 4:
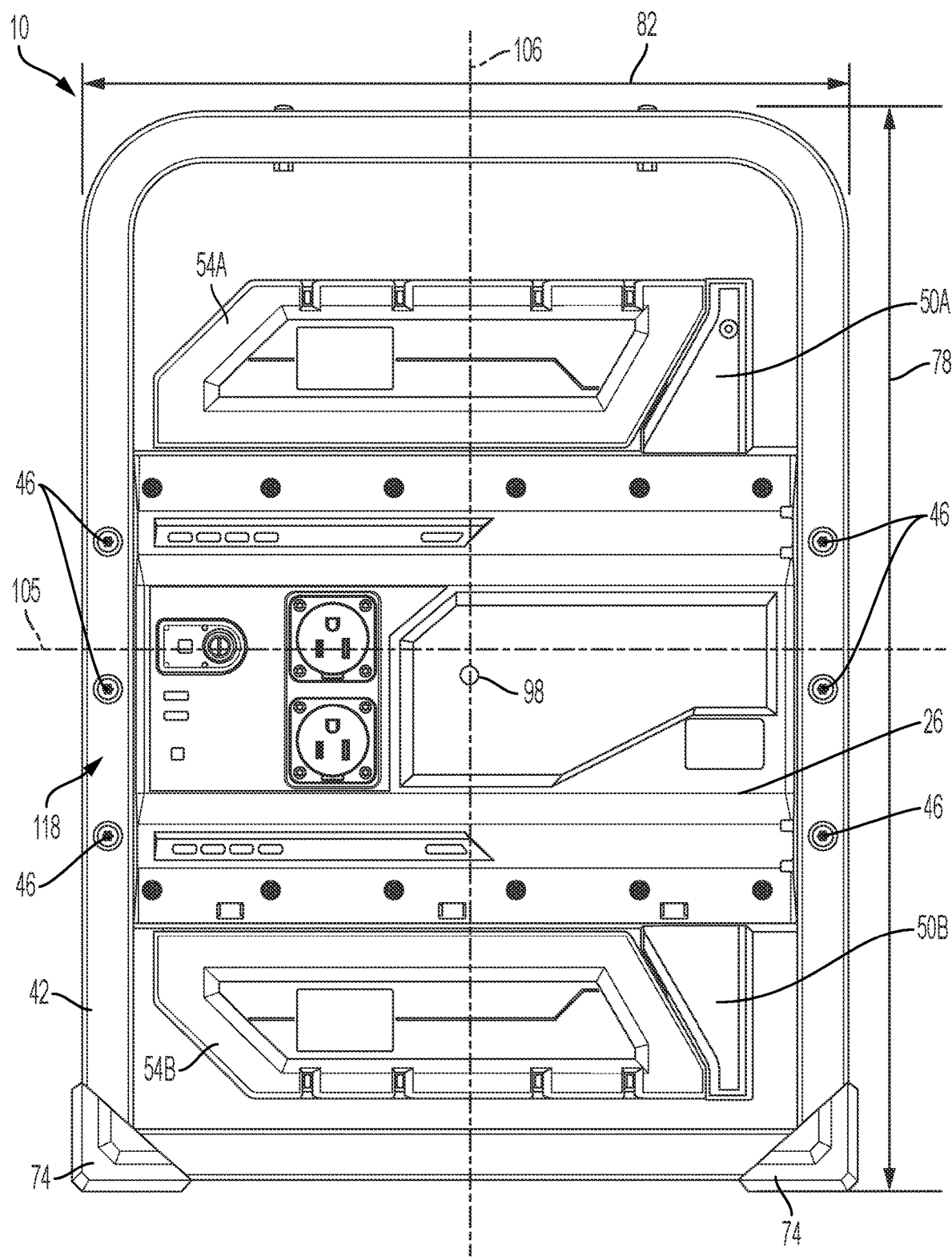
FIG. 4 is a front plan view of the portable power source of FIG. 1.
Figure 6:
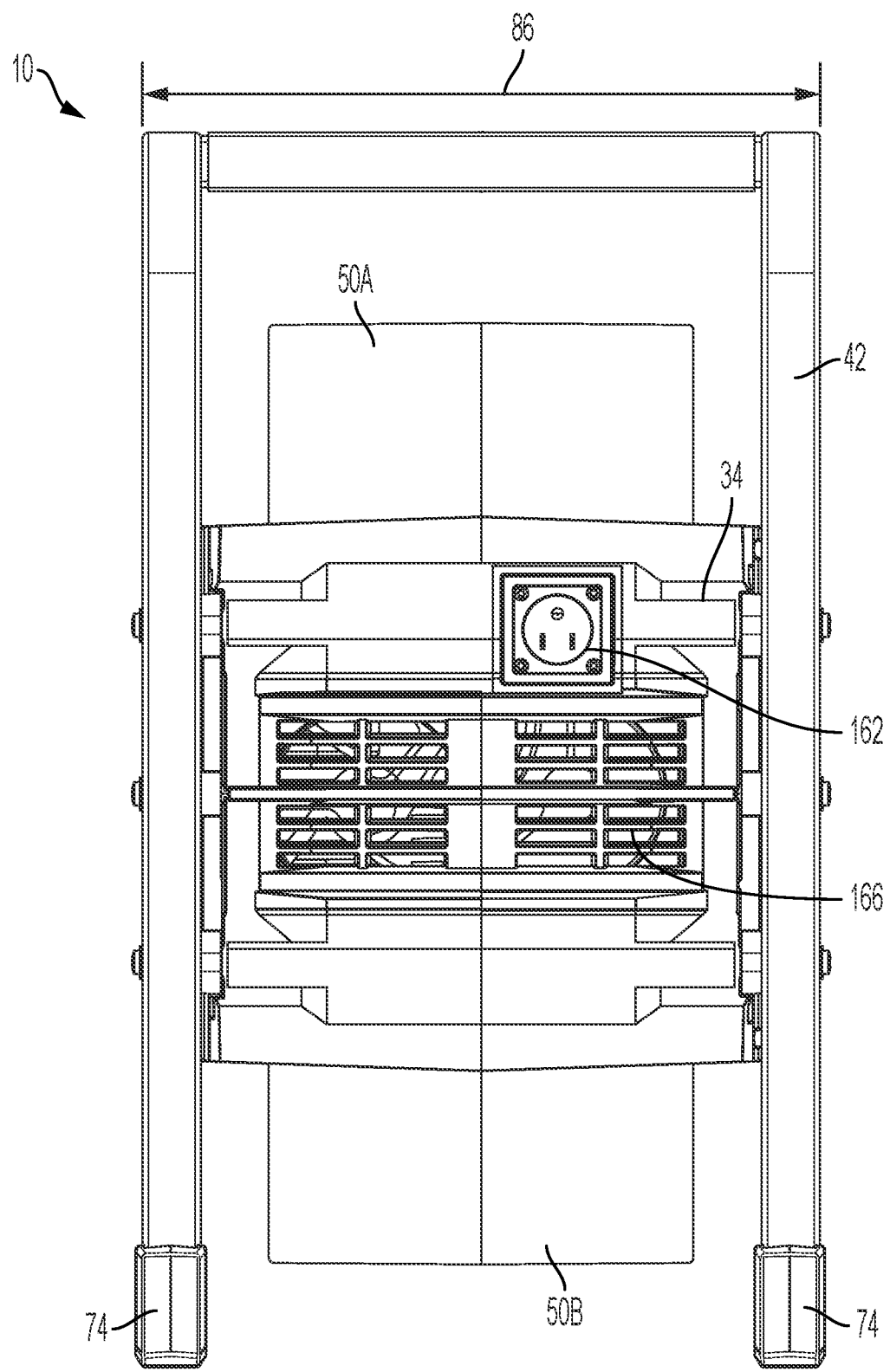
FIG. 6 is a first side plan view of the portable power source of FIG. 1.

With reference to FIG. 4, the illustrated portable power source 10 defines a height 78 within a range of approximately 520 mm to approximately 540 mm. In some embodiments, the height 78 is approximately 527.5 mm. The illustrated portable power source 10 defines a width 82 within a range of approximately 370 mm to approximately 390 mm. In some embodiments, the width 82 is approximately 374 mm. With reference to FIG. 6, the illustrated portable power source 10 defines a depth 86 within a range of approximately 280 mm to approximately 300 mm. In some embodiments, the depth 86 of approximately 289 mm.

Figure 5:
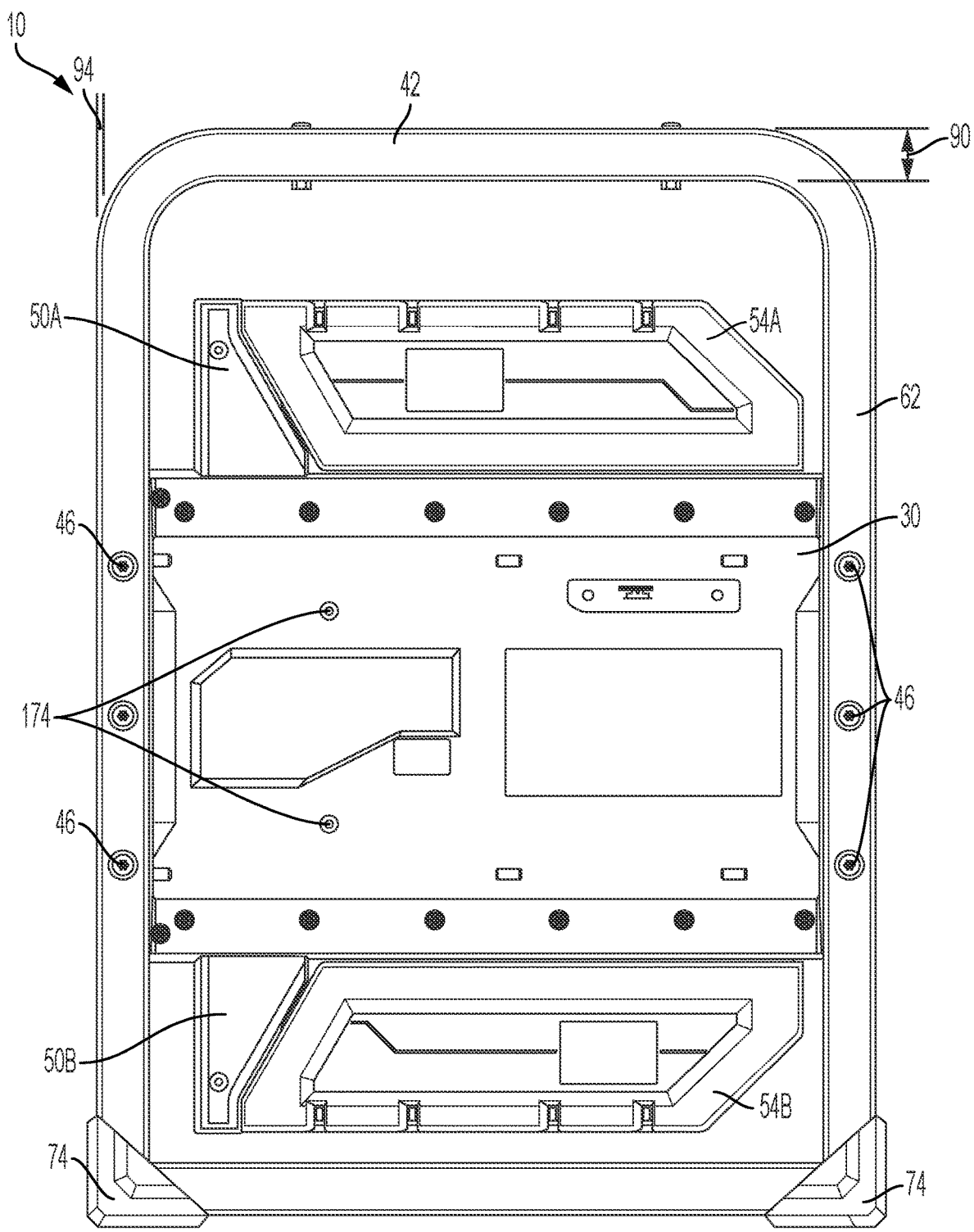
FIG. 5 is a rear plan view of the portable power source of FIG. 1.

With reference to FIG. 5, a cross-sectional size 90 (e.g., a wall length of the rectangular tube, a diameter of the round tube) of the roll cage 42 is within a range of approximately (20.3 mm) 0.8 in to approximately (30.5 mm) 1.2 in. In some embodiments, the bar size 90 is approximately (25.4 mm) 1 in. A wall thickness 94 of the roll cage 42 is within a range of approximately 0.8 mm to approximately 1.7 mm. In some embodiments, the wall thickness 94 is approximately 1.0 mm. In some embodiments, the wall thickness 94 is approximately 1.5 mm.

The total weight of the portable power source 10 including two "20S2P" configuration battery packs 54 is within a range of approximately (21.7 kgs) 48 lbs. to approximately (25 kgs) 55 lbs. (e.g., approximately (24.4 kgs) 53.8 lbs.). In some embodiments, the total weight of the portable power source 10 including two "20S2P" configuration battery packs 54 is approximately (22.6 kgs) 50 lbs. As mentioned above, the weight of a single "20S2P" battery pack 54 is approximately (5 kgs) 11 lbs. such that the weight of the portable power source 10 itself is approximately (11.8 kgs) 26 lbs. to approximately (15 kgs) 33 lbs.

In the illustrated construction (see FIG. 4), the portable power supply 10 may define a horizontal centerline 102. The portable power supply 10 is constructed to have a center of gravity 98 slightly below a horizontal centerline 102 of the portable power supply 10. The horizontal centerline 102 is halfway between the top end and the bottom end of the portable power supply 10.

With reference to FIG. 4, the center of gravity 98 is within a range of approximately 15 mm to approximately 25 mm below the centerline 102. The center of gravity 98 of the portable power source 10 is below the horizontal centerline by about 2.5% of the height 78 of the portable power source 10 to about 5% of the height 78. In some embodiments, the center of gravity 98 is approximately 20 mm below the centerline 102. In some embodiments, the center of gravity is approximately 243 mm from the bottom of the portable power supply 10.

With reference to FIG. 4, the center of gravity 98 is on the vertical centerline 106 of the portable power supply 10. The vertical centerline 106 is halfway between the first side 34 and the second side 38 of the portable power supply 10. In some embodiments, the center of gravity 98 is approximately 186.5 mm from the first side 34 of the portable power source 10. In some embodiments, the center of gravity 98 is slightly towards the first side 34 from the vertical centerline 106. The center of gravity 98 may be approximately 6.6 mm from the centerline 106 towards the first side 34. The center of gravity 98 is toward the front of the housing from the vertical centerline 106 by about 1.5% of the depth 86 to about 3% of the depth. The center of gravity 98 is toward the front of the housing from the vertical centerline 106 by about 5 mm to about 8 mm.

The lower center of gravity 98 may inhibit or prevent the portable power supply 10 from tipping when the portable power supply 10 is resting on the ground. Additionally, the lower center of gravity 98 may allow for easier carrying of the portable power supply 10.

Figure 8A:
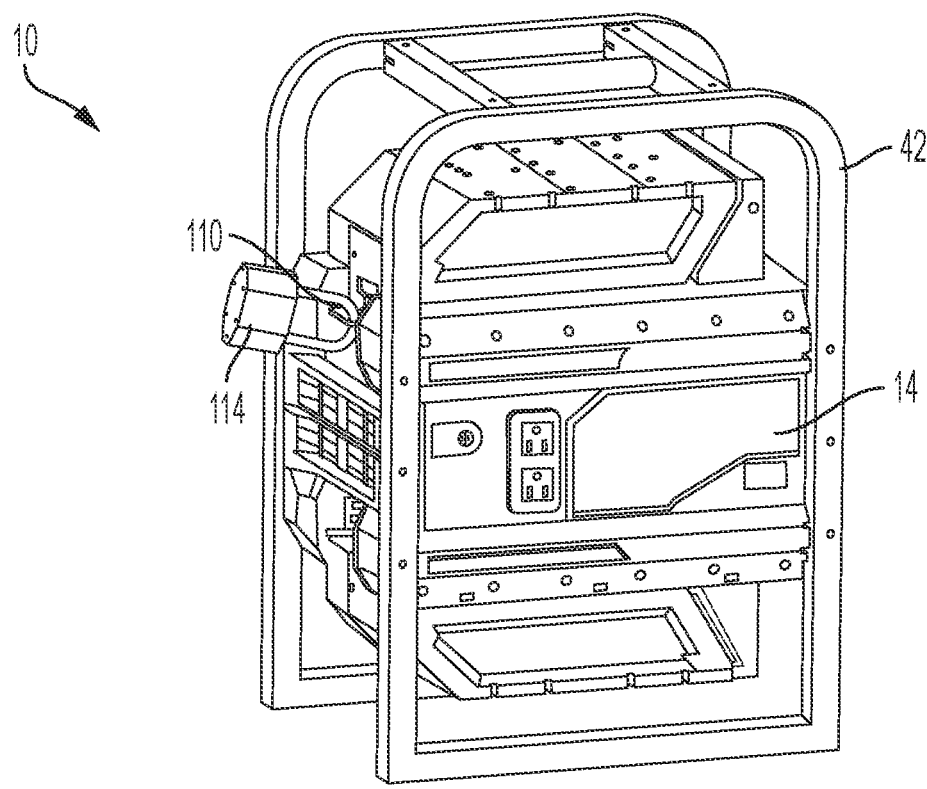
FIGS. 8A and 8B illustrate a padlock interface of the portable power source of FIG. 1.
Figure 8B:
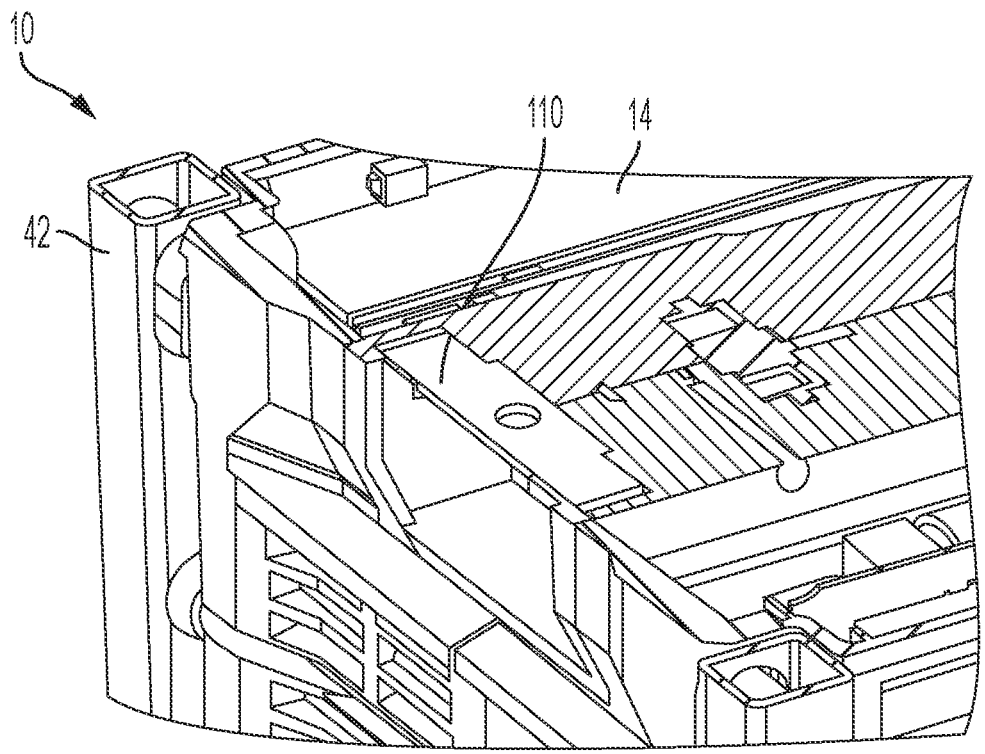

With reference to FIGS. 8A and 8B, the portable power source 10 includes a battery lock point 110 for each battery pack 54A, 54B. A padlock 114 may be installed at the battery lock point 100 to prevent the battery packs 54 from being detached from the housing 14. The padlock 114 is engageable with the battery support 50 to prevent removal of the battery pack 54A, 54B. When installed, each padlock 114 may extend into and block the removal path of an associated battery pack 54A, 54B. Additionally or alternatively, the installed padlock 114 may interfere with operation of an associated battery latch mechanism (described below) to prevent removal of the battery pack 54A, 54B.

Additional lock points, for example a padlocked cover (not shown), may be provided on the front 26 of the housing 24 to prevent access to components of the portable power source 10 (e.g., to prevent access to the electrical outlets).

Figure 9:
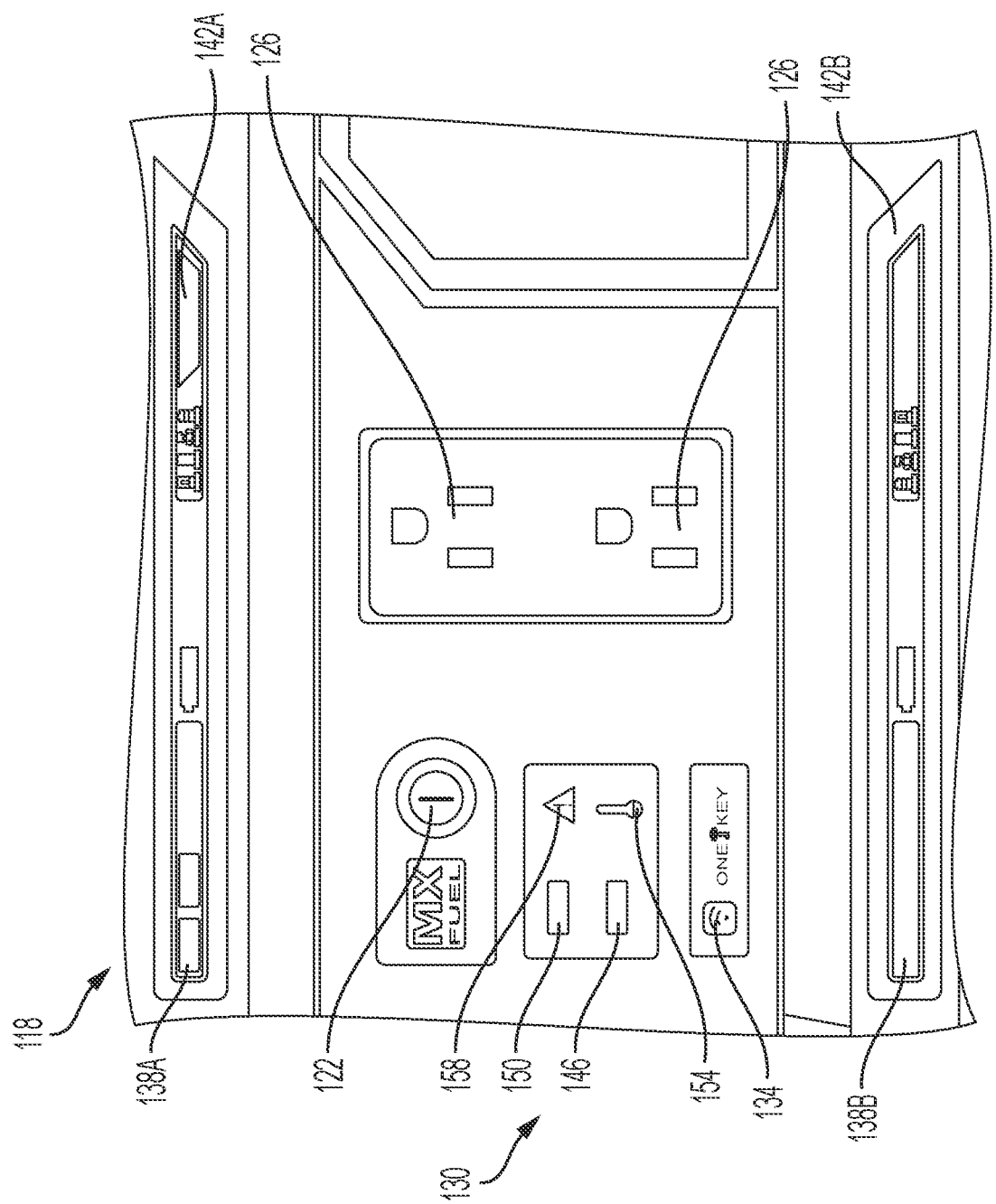
FIG. 9 illustrates a user interface of the portable power source of FIG. 1.

FIG. 9 illustrates a user interface 118 provided on the front 26 of the housing 14. In the illustrated example, the user interface 118 includes a power button 122, AC outlets 126, and a number of indicators (e.g., over-condition indicators 130, a wireless connection indicator 134, fuel gauges 138, battery charging indicators 142, etc.). The illustrated indicators include visual indicators and, in other constructions (not shown), may include other types of indicators, such as audible, tactile, etc.

The power button 122 may be implemented as a pushbutton, a two-way switch, a touch button, etc. The power button 122 is used to control power output to the user interface 118 and can be activated to turn the portable power source 10 ON or OFF. When the power button 122 is used to turn ON the portable power source 10, power output through the AC outlets 126 is enabled and the over-condition indicators 130 and the fuel gauges 138 are activated to display indications. When the power button 122 is used to turn OFF the portable power source 10, power output through the AC outlets 126 is disabled and the over-condition indicators 130 and the fuel gauges 138 are deactivated.

The AC outlets 126 are 15 A, 120 V AC outlets that provide a similar power output as a wall outlet. The AC outlets 126 are powered by the battery packs 54. In the illustrated example, the over-conditions indicators 130 include an over-temperature indicator 146 and an overload indicator 150. A label 154, 158 may be provided alongside the over-temperature indicator 146 and the overload indicator 150, respectively.

The over-temperature indicator 146 is activated when a temperature of the portable power source 10 or the battery packs 54 exceeds a predetermined temperature threshold. The overload indicator 150 is activated when a load output of the portable power source 10 exceeds a predetermined load threshold.

The wireless connection indicator 134 indicates whether the portable power source 10 is wirelessly-connected to a remote device (e.g., a smartphone or other user device). The fuel gauges 138A, 138B indicate the state-of-charge of the associated battery pack 54A, 54B, respectively. A charge indicator 142A, 142B indicates a charging state of the associated battery pack 54A, 54B.

With reference to FIGS. 1 and 6, an AC input 162 is provided on the first side 34 of the housing 14. The AC input 162 may include a retractable or removable cable that can be plugged into an external power source (e.g., a 15 A, 120 V wall outlet). The AC input 162 is used to supply power to charge the battery packs 54 supported on the portable power source 10. When connected to an external power source, the portable power source 10 may pass through AC power to the AC outlets 126 in addition to charging the supported battery pack(s) 54.

Figure 7:
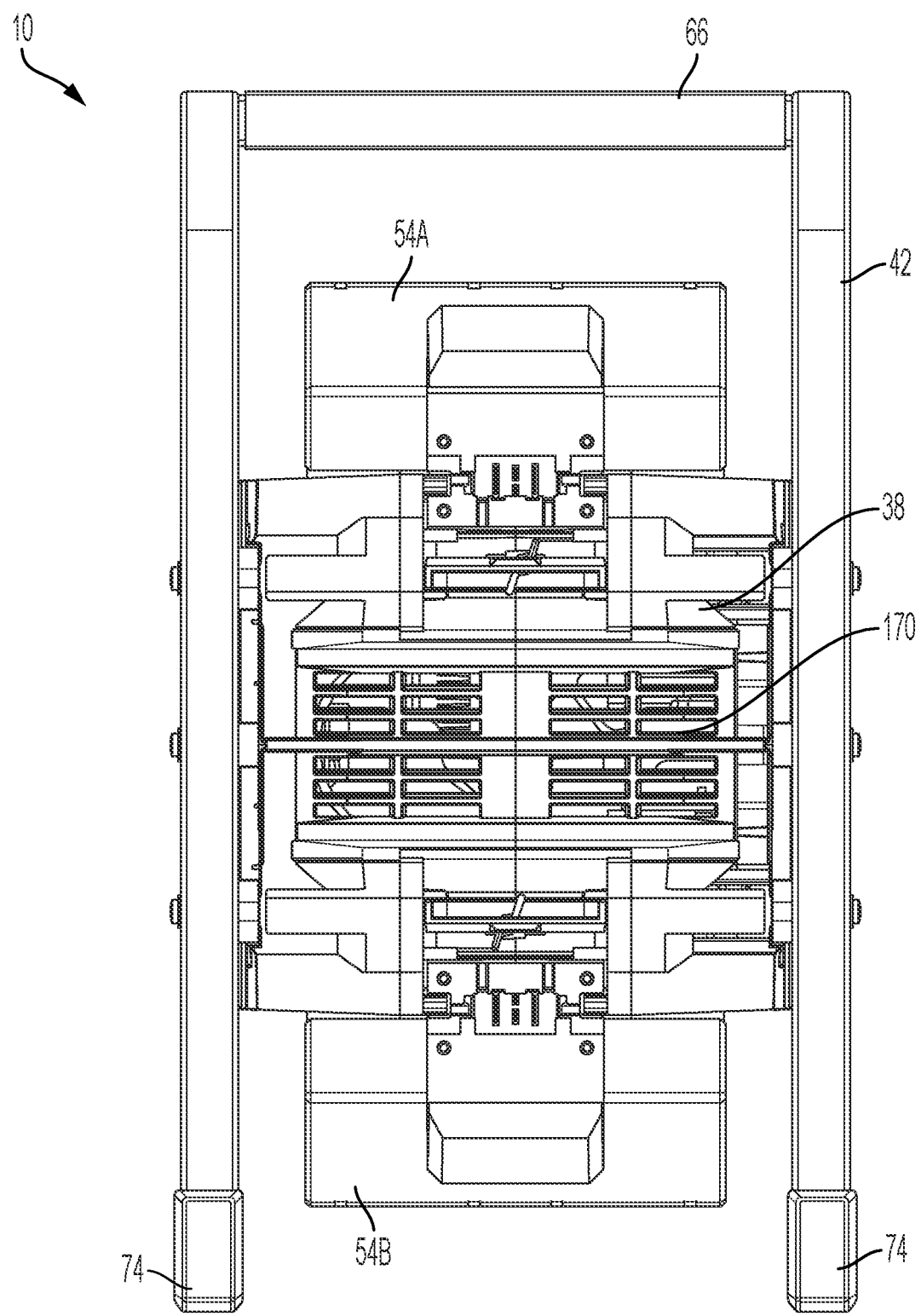
FIG. 7 is a second side plan view of the portable power source of FIG. 1.

With reference to FIGS. 6-7, first air vents 166 and second air vents 170 are provided on opposite side 36, 38 of the housing 14, respectively. The first air vents 166 and the second air vents 170 allow for cooling air to circulate within the housing 14 to cool components (e.g., the electronics) of the portable power source 10.

Figure 10:
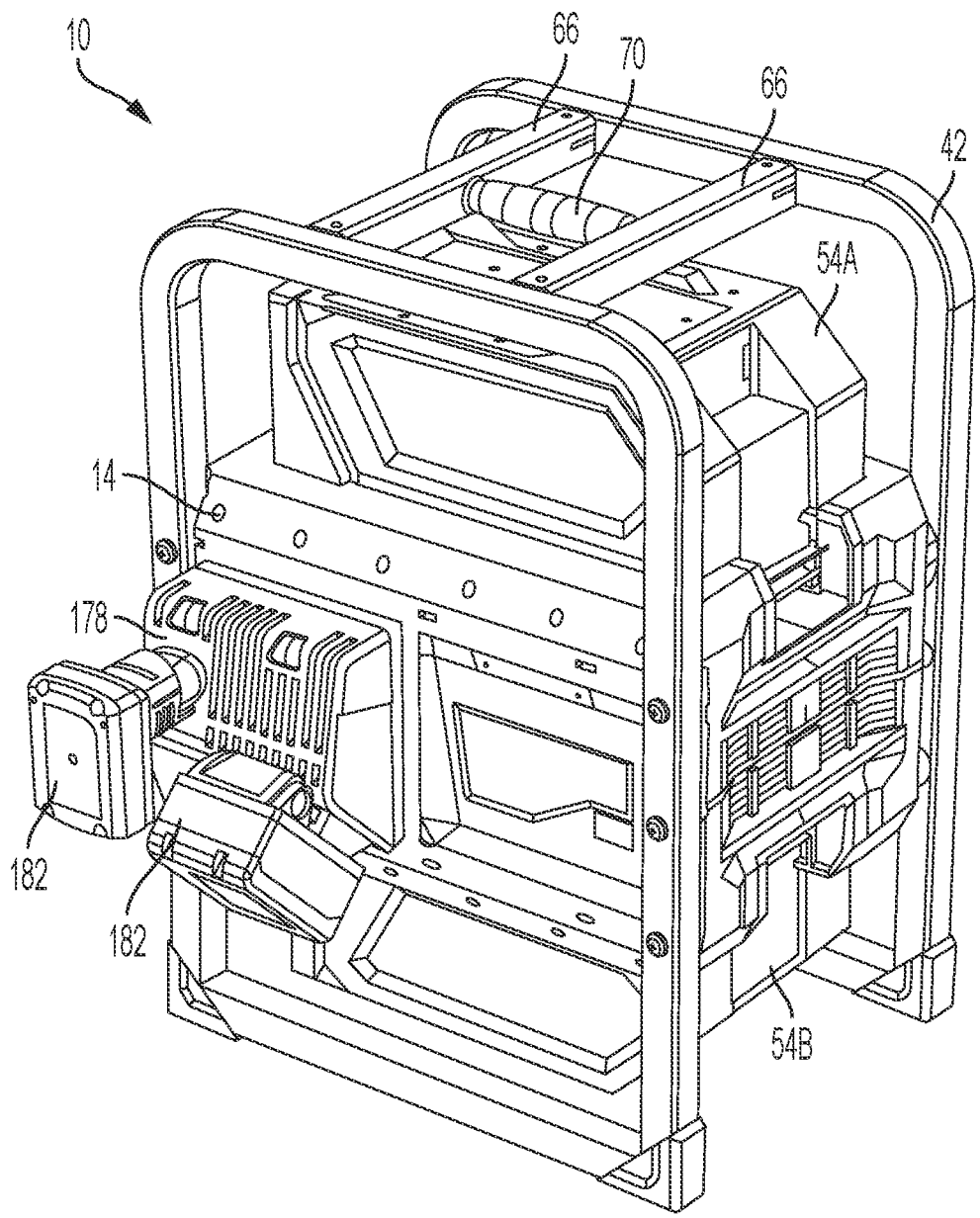
FIG. 10 is a perspective view of the portable power source of FIG. 1 with a power tool battery charger mounted.

With reference to FIGS. 5 and 10, a charger mounting point 174 is provided on the rear 30 of the housing 14. A separate battery charger 178, operable to charge battery packs 182 for battery-powered power tools, outdoor tools, other electrical devices, can be mounted (as shown in FIG. 10) to the charger mounting point 174. The battery charger 178 receives operating power from the battery packs 54 to charge the supported battery packs 182. The battery charger 178 may be powered simultaneously to power being output to the AC outlets 126.

Figure 11:
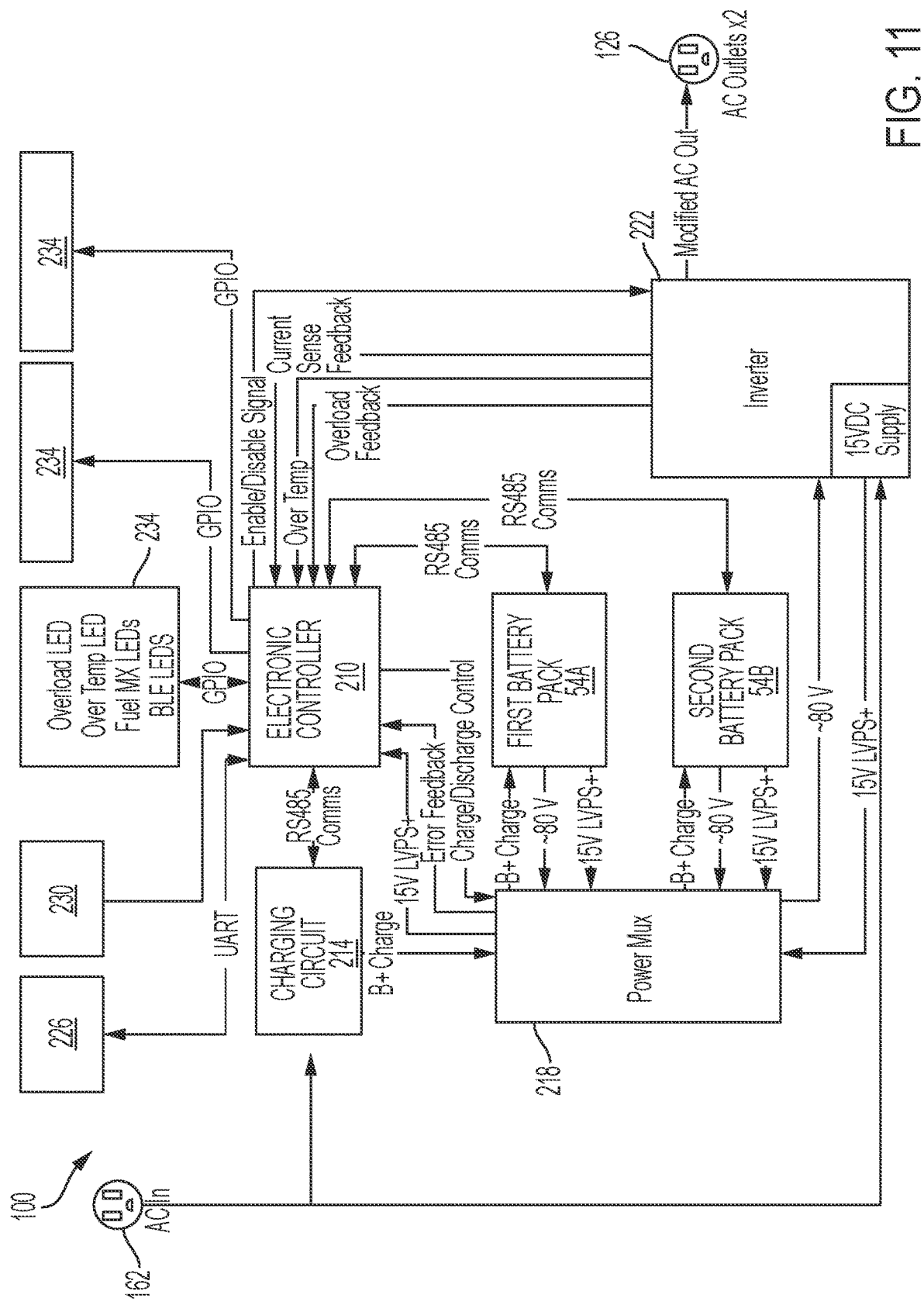
FIG. 11 is a block diagram of the portable power source of FIG. 1.

FIG. 11 is a simplified block diagram of one embodiment of the portable power source 10. In the illustrated example, the portable power source 10 includes the battery pack 54A, 54B, the AC outlets 126, the AC input 162, an electronic controller 210, a charging circuit 214, a power multiplexer 218, an inverter 222, a wireless module 226, a low power battery cell 230, and indicators 234.

In some embodiments, the controller 210 is implemented as a microprocessor with separate memory. In other embodiments, the controller 210 may be implemented as a microcontroller (with memory on the same chip). In other embodiments, the controller 210 may be implemented partially or entirely as, for example, a field programmable gate array (FPGA), an application specific integrated circuit (ASIC), a hardware implemented state machine, and the like, and a memory may not be needed or modified accordingly. The controller 210 may communicate with a battery controller of each battery pack 54 over a data connection (e.g., an RS485 full-duplex standard connection).

The charging circuit 214 is controlled by the controller 210 to provide charging current to the battery packs 54 through the multiplexer 218. The charging circuit 214 receives input power from the AC input 162 and provides the charging current to the multiplexer 218.

The multiplexer 218 receives the charging current from the charging circuit 214 and provides the charging current to the battery packs 54. The multiplexer 218 also receives a low-voltage power supply (e.g., a 15 VDC power supply) from the battery packs 54 and/or the inverter 222. The multiplexer 218 provides the low-voltage power supply to power electronic components of the portable power source 10. For example, the multiplexer 218 powers the controller 210 and the indicators 234 with the low-voltage power supply.

The multiplexer 218 also receives high-voltage DC power supply (e.g., 80 V, 120 V, etc.) from the battery packs 54. The multiplexer 218 provides the high-voltage DC power supply to the inverter 222. The multiplexer 218 receives control signals (e.g., selection signals) from the controller 210. The controller 210 provides control signals to the multiplexer 218 to control charging and discharging of the battery packs 54.

The inverter 222 receives the high-voltage DC power supply from the multiplexer 218 and converts the high-voltage DC power supply to an AC output (e.g., a 15 A, 120 VAC power output). The AC output is then provided to the AC outlets 126. The inverter 222 also receives input power from the AC input 162 and provides a low-voltage power supply (e.g., 15 VDC) to the multiplexer 218. The multiplexer 218 may be controlled to use the low-voltage power supply from the inverter 218 rather than from the battery packs 54 when the portable power source 10 is connected to an external power source (e.g., a wall outlet) to conserve energy of the battery packs 54.

The inverter 222 may be controlled by the controller 210, for example, based on the power button 122. The controller 210 provides enable/disable signals to the inverter 22 to enable or disable the inverter 222 from providing AC output to the AC outlets 126. The inverter 222 provides additional feedback to the controller 210. For example, the inverter 222 provides an over-temperature signal when the temperature of the inverter 222 exceeds a predetermined temperature threshold, an overload feedback signal when the load on the AC outlets 126 exceeds a predetermined load threshold, and provides a current sensor feedback indicating the amount of output current flowing to the AC outlets 126.

The wireless module 226 is, for example, a Bluetooth® Low Energy (BLE) module that enables wireless communication between the portable power source 10 and a user device (e.g., a smartphone, a laptop computer, etc.). The wireless module 226 may be powered by the dedicated low power battery cell 230.

The controller 210 controls the indicators 234 (e.g., visual, audible, tactile, etc.) based on the status of the portable power source 10. The indicators 234 include visual indicators (e.g., the wireless connection indicator 134, the fuel gauges 138, the over-temperature indicator 146, and the overload indicator 150), and an audible indicator (e.g., a buzzer (not shown)). In other embodiments, the indicators 234 may include more or fewer status indicators 234 than those illustrated in FIG. 11.

In some embodiments, the controller 210 determines whether the portable power source 10 is wirelessly connected to a remote device and controls the wireless connection indicator 134 based on the determination. The controller 210 activates the wireless connection indicator 134 when the controller 210 determines that the portable power source 10 is wirelessly connected to the user device through the wireless module 226. The controller 210 deactivates the wireless connection indicator 134 when the controller 210 determines that the portable power source 10 is not wirelessly connected to an external device through the wireless module 226.

Referring to FIG. 9, in the illustrated construction, the fuel gauges 138 are located on the same side as AC outlets 126 on the user interface 118. The first fuel gauge 138A provides an indication of the state-of-charge of the first battery pack 54A, and the second fuel gauge 138B provides an indication of the state-of-charge of the second battery pack 54B. The controller 210 receives battery state-of-charge information from the battery controller of each battery pack 54. The controller 210 controls the fuel gauges 138 to indicate the battery level of the battery packs 54 based on the state-of-charge information received from the respective battery controllers.

The controller 210 activates or deactivates the over-temperature indicator 146 based on the temperature signals received from the battery packs 54 and the inverter 222. The controller 210 activates or deactivates the overload indicator 150 based on the overload feedback received from the inverter 222.

The exemplary buzzer provides an audible indication to a user based on control signals received from the controller 210. The buzzer may provide an audible indication for various threshold conditions of the portable power source 10. The threshold conditions may include a low voltage condition (one or both battery packs 54 below a low-voltage threshold (e.g., 50 V or less)), an overload condition (an overload threshold based on a power profile (e.g., a power output for a time period—1800 W for 7 s or more, 3600 W for 3.5 s or more, etc.)), a temperature condition (a temperature of the portable power source 10 or its components (e.g., 110° C.)).

The portable power source 10 may include additional visual, audible, tactile, or other indicators to provide the low voltage, overload, and over temperature indications as described above with respect to the audible buzzer.

Figure 12:
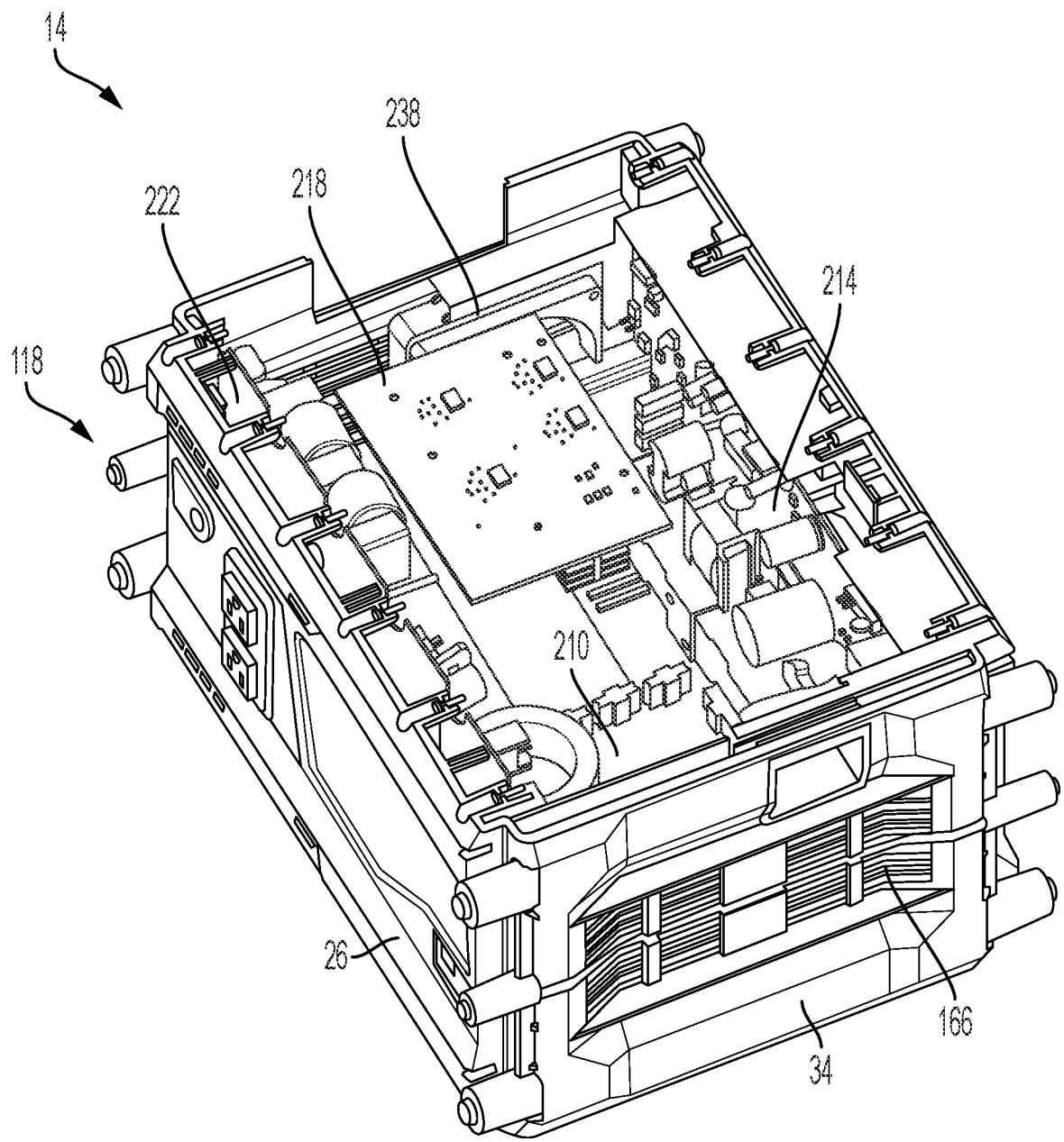
FIG. 12 is an interior view of the portable power source of FIG. 1.
Figure 13:
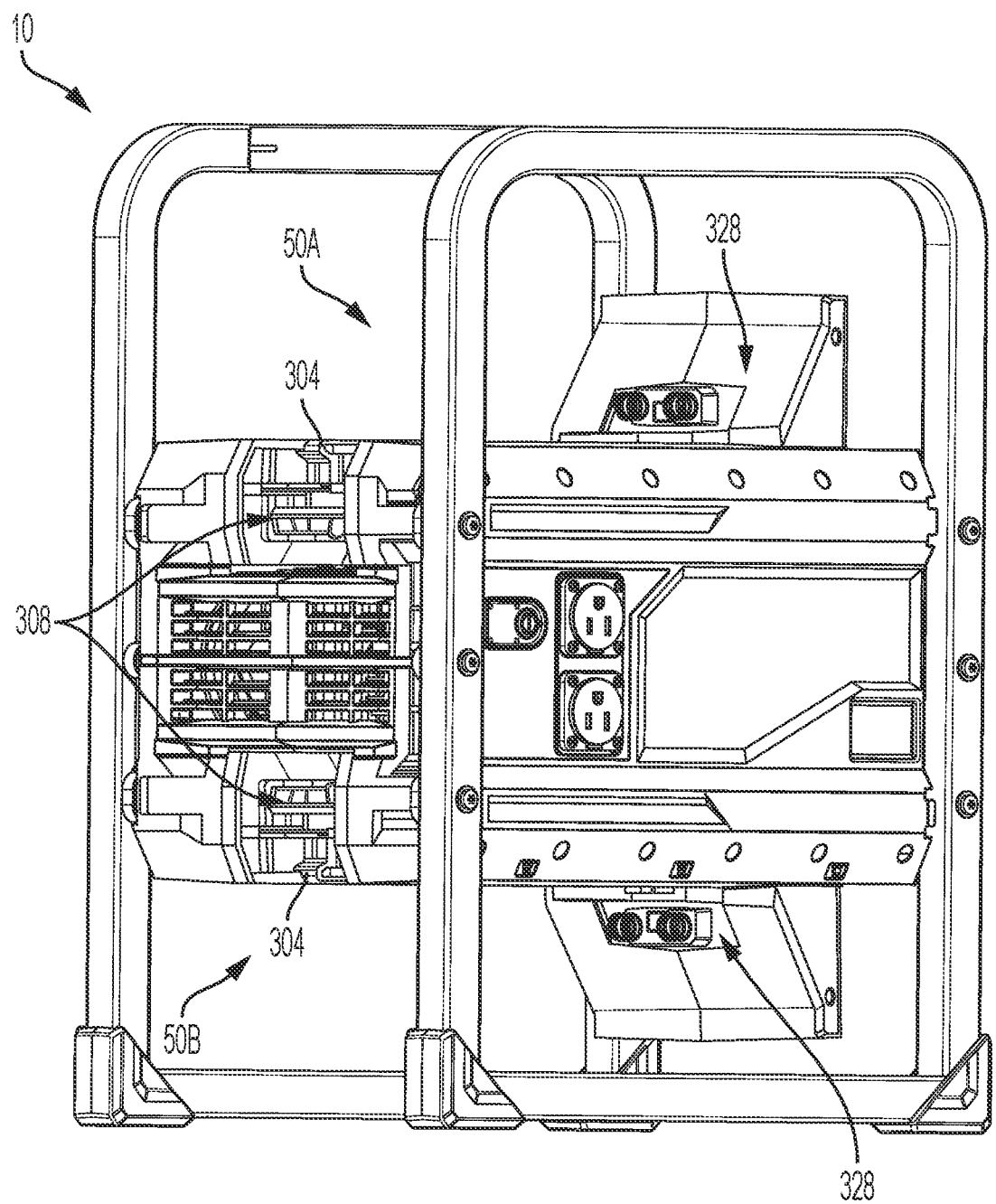
FIG. 13 is a perspective view of the portable power source of FIG. 1 with the battery packs removed.
Figure 14:
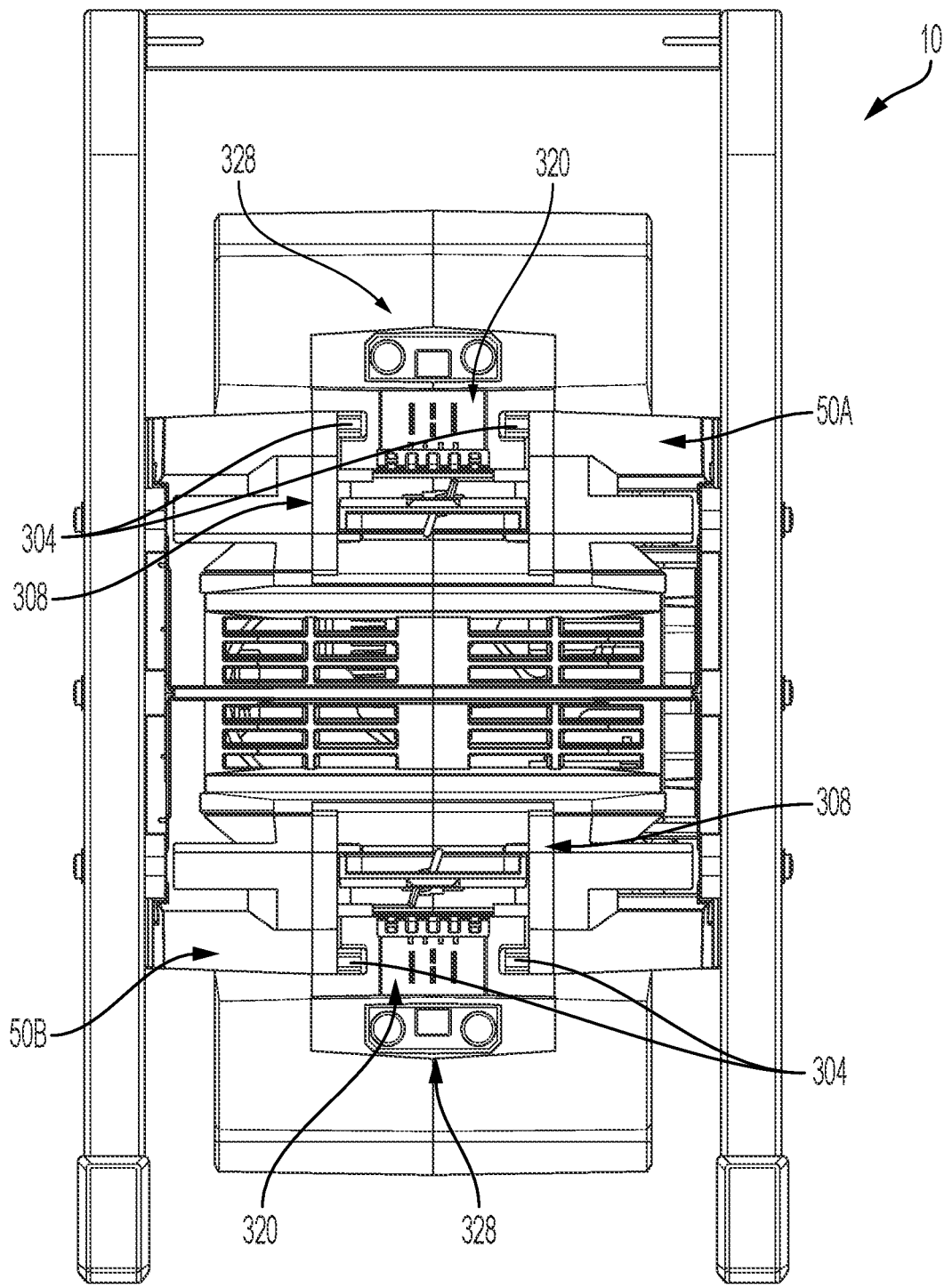
FIG. 14 is a front view of the portable power source as shown in FIG. 13.
Figure 15:
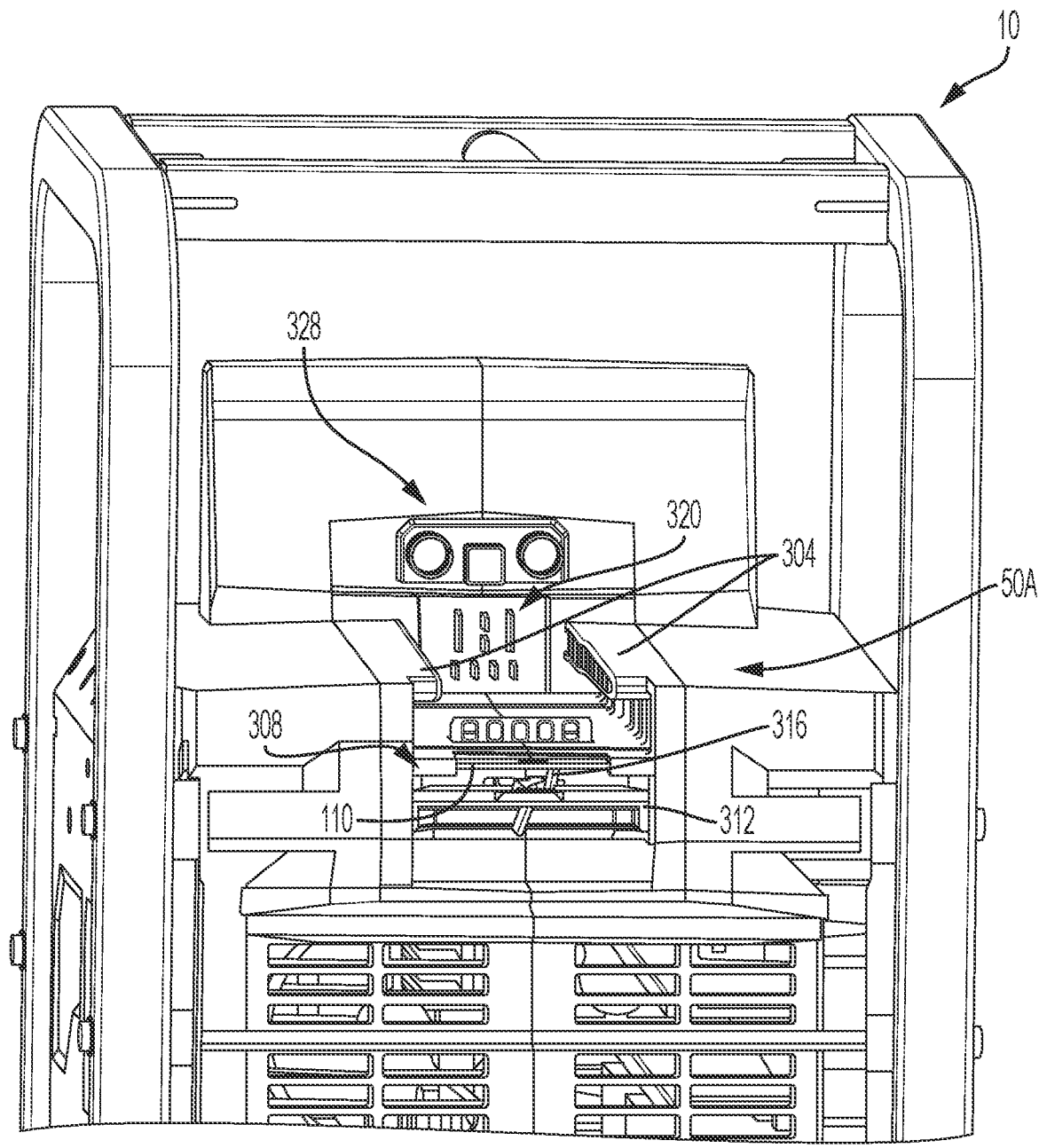
FIG. 15 is a front perspective view of a portion of the portable power source as shown in FIG. 13.
Figure 16:
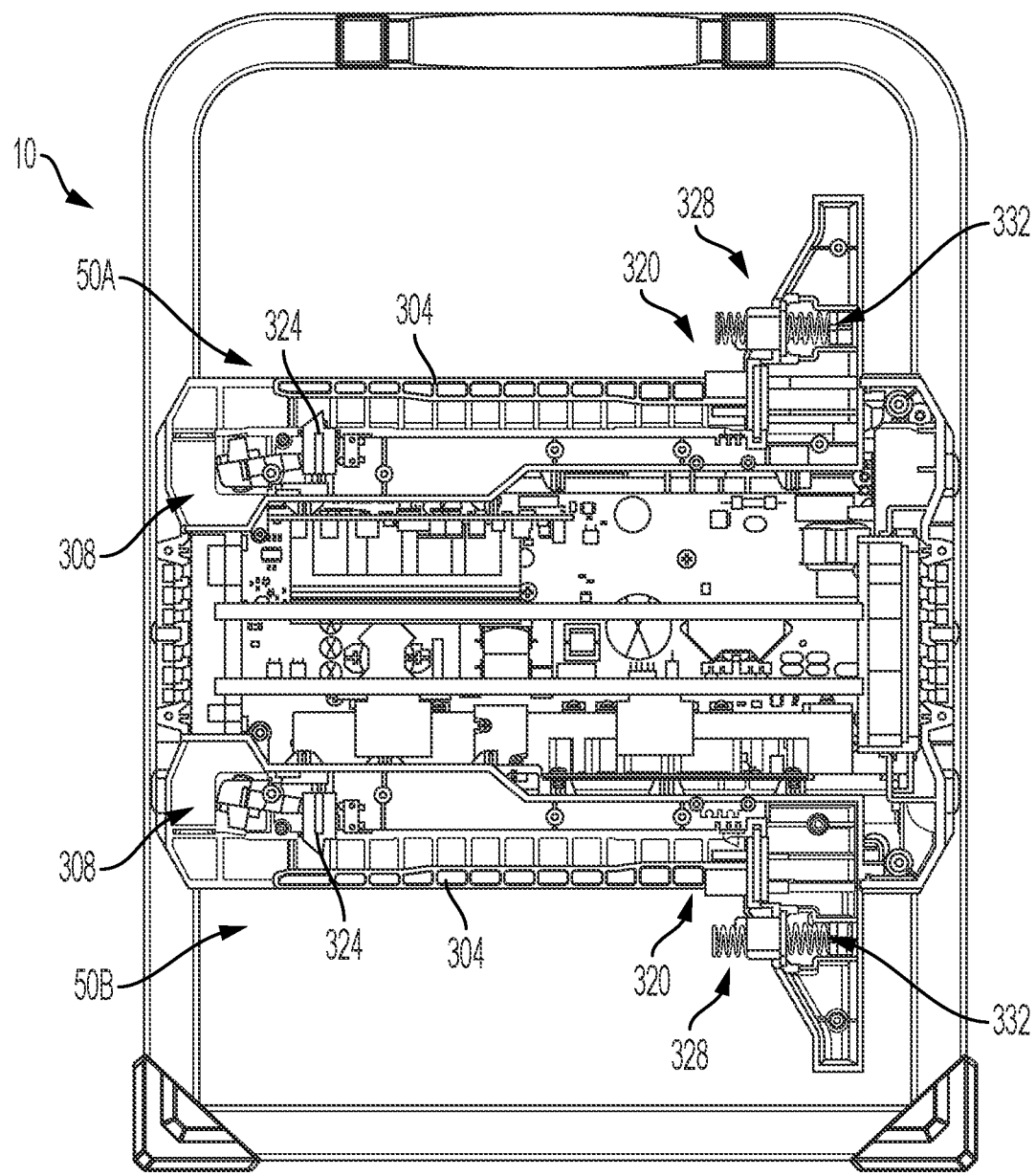
FIG. 16 is a side cross-sectional view of the portable power source as shown in FIG. 13.

FIG. 12 illustrates placement of electronic components of the portable power source 10 within the housing 14. The controller 210 is provided along a bottom surface by the bottom 22 of the housing 14. The charging circuit 214 is provided along a rear surface by the rear 30 of the housing. The multiplexer 218 is provided along a top surface by the top 18 of the housing 14. The inverter 222 is provided along a front surface by the front 26 of the housing 14. An open area is provided along the central portion of the interior of the housing 14 to allow a cooling air to flow through the housing 14. Cooling fans 238 may be provided proximate the first air vents 166 and/or the second air vents 170 to draw cooling air into the housing 14 through the first air vents 166 and/or second air vents 170 and to circulate the cooling air through the housing 14.

The illustrated portable power source 10 is a multiple-bay portable power source that includes two bays (that is, battery supports 50) to receive battery packs 54. The multiple battery packs 54 may be sequentially or simultaneously charged and discharged by the portable power source 10. For example, the controller 210 may implement a pulse-width-modulated (PWM) control of the multiplexer 218 to charge and discharge the battery packs. As a consequence, a single charging circuit 214 and a single inverter 222 may be used to charge and discharge multiple battery packs 54.

In some embodiments, the controller 210 may detect the presence of input power through the AC input 162 (e.g., via data communications with the charging circuit 214). For example, the charging circuit 214 may provide an indication to the controller 210 when the AC input 162 is connected to a wall outlet.

The controller 210 may automatically switch between charging control and discharging control of the multiplexer 218 based on the indication received from the charging circuit 214. For example, upon detecting input power at the AC input 162, the controller 210 may control the multiplexer 218 to stop discharging the battery packs 54 and to perform charging of the battery packs 54. Similarly, upon detecting that the AC input 162 is not receiving input power, the controller 210 may control the multiplexer 218 to stop charging the battery packs 54 and, if the battery packs 54 have sufficient capacity, to perform discharging of the battery packs 54.

In some embodiments, the peak power output of the portable power source 10 is within a range of approximately 3000 W to approximately 4000 W (e.g., 3400 W) for a short period of time of between about 2 seconds and about 4 seconds (e.g., 3 seconds). The portable power source 10 may be operable to output a peak power output of between about 3000 W and about 4000 W for at least 2 seconds. In some embodiments, the portable power source 10 can provide a peak output power of approximately 3600 W for at least approximately 3.5 seconds.

In some embodiments, the sustained or continuous maximum output power is within a range of approximately 1500 W to 2000 W. The portable power source 10 may be operable to output a sustained maximum output power of between about 1500 W and about 2000 W for at least about 6 minutes. In some embodiments, the sustained or continuous maximum output power is approximately 1800 W. The portable power source 10 may be operable to output a sustained maximum output power of 1800 W for at least about 6 minutes.

A runtime at maximum output power for a portable power source 10 with a single "20S3P" battery pack is within a range of approximately 18 minutes to approximately 21 minutes (e.g., about 20.5 minutes). In some embodiments, the runtime at maximum output power for the portable power source 10 with a single "20S3P" battery pack is approximately 19.5 minutes. In some embodiments, a runtime at maximum output power for a portable power source 10 with two "20S3P" battery packs is within a range of approximately 36 minutes to approximately 42 minutes. In some embodiments, the runtime at maximum output power for the portable power source 10 with two "20S3P" battery packs is approximately 39 minutes.

A runtime at maximum output power for a portable power source 10 with a single "20S2P" battery pack is within a range of approximately 12 minutes to approximately 14 minutes (e.g., about 12.25 minutes). In some embodiments, the runtime at maximum output power for the portable power source 10 with a single "20S2P" battery pack is approximately 13 minutes. In some embodiments, a runtime at maximum output power for a portable power source 10 with two "20S2P" battery packs is within a range of approximately 24 minutes to approximately 28 minutes. In some embodiments, the runtime at maximum output power for the portable power source 10 with two "20S2P" battery packs is approximately 26 minutes.

A runtime at maximum output power for a portable power source 10 with a single "20S1P" battery pack is within a range of approximately 6 minutes to approximately 7 minutes. In some embodiments, the runtime at maximum output power for the portable power source 10 with a single "20S1P" battery pack is approximately 6.5 minutes. In some embodiments, a runtime at maximum output power for a portable power source 10 with two "20S1P" battery pack is within a range of approximately 12 minutes to approximately 14 minutes. In some embodiments, the runtime at maximum output power for the portable power source 10 with two "20S1P" battery packs is approximately 13 minutes.

FIGS. 13-16 illustrate the portable power source 10 without the battery packs 54A, 54B to illustrate the battery support 50A, 50B for each battery pack 54A, 54B. The illustrated battery supports 50A, 50B include includes stepped grooves 304 and a latching mechanism 308 to facilitate coupling of the battery pack 54 to the battery support 50. In other embodiments (not shown), the grooves 304 may be substantially linear.

The illustrated latching mechanism 308 includes (see FIG. 15) a dual-action latching mechanism. In other words, in order to operate the latching mechanism 308 to release the battery 54 from the battery support 50, two separate actions are required. The illustrated latching mechanism 308 includes a primary actuator 312 that supports a secondary actuator 316. In a blocking position, the secondary actuator 316 inhibits actuation of the primary actuator 312, and, in a release position, the primary actuator 312 is operable to unlatch the battery pack 54.

As mentioned above, the padlock 114 may inhibit removal of a supported battery pack 54 by interfering with the latch mechanism 308. For example, when installed, the padlock 114 may inhibit movement of the secondary actuator 316 from the blocking position. As another example, when installed, the padlock 114 may inhibit movement of the primary actuator to unlatch the battery pack 54.

Contacts 320 are supported on the battery support 50 and are configured to mechanically and electrically interface with the battery pack 54 to transfer electrical power therebetween. The illustrated latching mechanism 308 also includes (see FIG. 16) a switch 324 (e.g., a micro-switch) facilitating electrical coupling/decoupling of the battery pack 54 during actuation of the primary actuator 312. The switch 324 may act to electrically decouple the battery pack 54 from the battery support 50 and the portable power source 10 prior to removal of the battery pack 54 from the battery support 50.

An ejector 328 is supported on the battery support 50. The ejector 328 includes an ejection member biased by a biasing member (e.g., one or more springs (not shown)). When the battery pack 54 is attached to the battery support 50, the ejection member compresses the biasing member. From this position, the ejector 328 is configured to exert a force on the battery pack 54 to push the battery pack 54 out of engagement with the battery support 50 (e.g., upon release of the latching mechanism 308).

In the illustrated construction (see FIG. 16), a switch 332 (e.g., an AC switch) is incorporated into the ejector 328. The switch 332 is configured to activate/deactivate components of the portable power source 10 based on a position of the battery pack 54 relative to the battery support 50. In one example, depressing the ejector 328 causes activation of the switch 332 to permit power to be transferred to a portion of the portable power source 10 (e.g., the charging circuit 214, the power multiplexer 218, the inverter 222, etc.) when the battery pack 54 is initially inserted but prior to activation of the contacts 320 (e.g., for charging operations).

A similar battery support for a battery pack is described and illustrated in U.S. patent application Ser. No. 15/845,063, filed Dec. 18, 2017, entitled "BATTERY PACK INTERFACE", the entire contents of which are hereby incorporated by reference.

Figure 17:
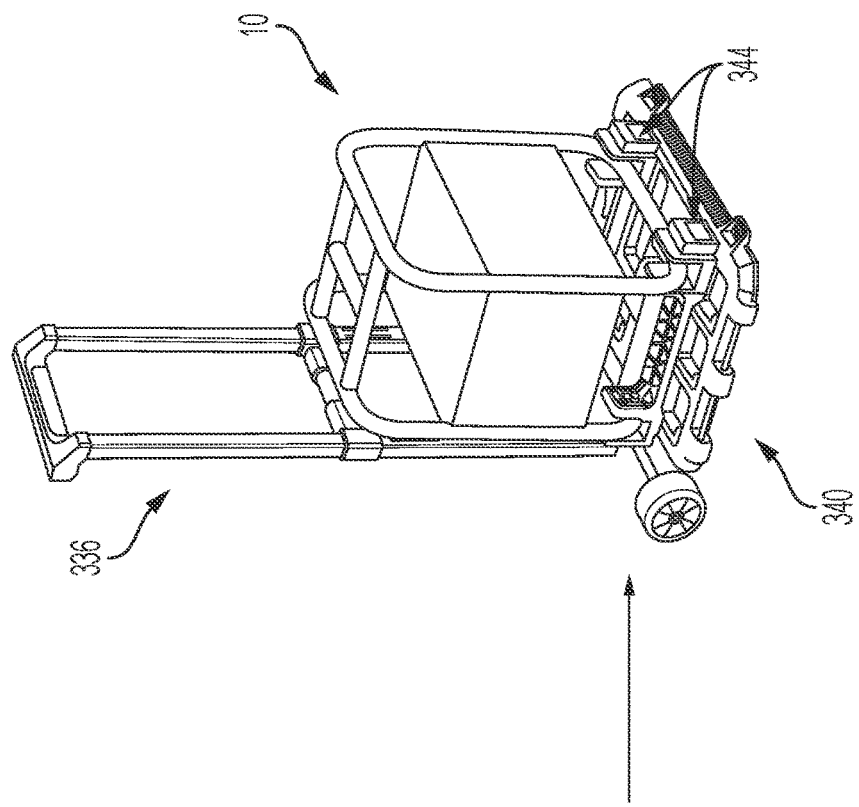
FIG. 17 includes perspective views of a transportation assembly for the portable power source of FIG. 1.
Figure 17:
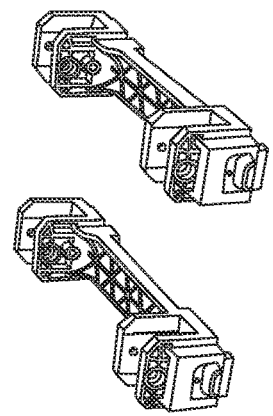
Figure 17:
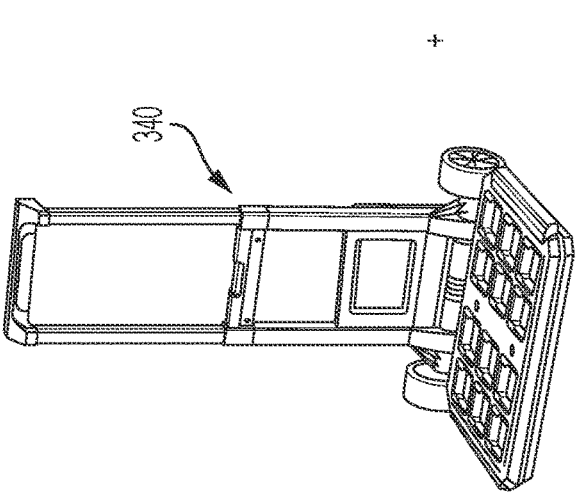

FIG. 17 illustrates a transportation assembly 336 for the portable power source 10. The transportation assembly 336 includes a wheeled dolly or cart 340 and connectors 344 connectable between a portion of the cart 340 (e.g., the base) and a portion of the portable power source 10 (e.g., the frame portions 58, 62. The illustrated connectors 344 are releasably connected (e.g., clamped) to each of the cart 340 and the portable power source 10.

The portable power source 10 will go anywhere that corded device users work and power at least a majority of the corded devices they use. The users can eliminate long extension cords, increase the performance of their corded devices, easily move from one work area to another on-site, and, ultimately, be more productive. This use of a battery-powered power source 10 may shift perceptions of cordless capabilities, fuel progression to a cordless jobsite, drive penetration and expansion of future battery-powered devices, changing the way users do their jobs.

Although the invention has been described in detail with reference to certain preferred embodiments, variations and modifications exist within the scope and spirit of one or more independent aspects of the invention as described. One or more independent features and/or independent advantages of the invention may be set forth in the claims.

What is claimed is:

1. A portable power source comprising:
   a housing defining a battery support and a power outlet,
   a circuit supported by the housing and including
      an input terminal on the battery support,
      an output terminal on the power outlet, and
      an inverter electrically connected between the input terminal and the output terminal,
   a battery power source including
      a battery housing supported on the battery support,
      a battery cell, and
      a battery terminal connected to the battery cell and electrically connectable to the input terminal, wherein power is transferrable from the battery cell to the circuit to be output through the power outlet, and
   a frame connected to the housing and extending beyond a periphery of the housing and the supported battery power source.

2. The portable power source of claim 1, wherein the portable power source defines a horizontal centerline, and wherein a center of gravity of the portable power source is below the horizontal centerline.

3. The portable power source of claim 2, wherein the center of gravity is below the horizontal centerline by between 2.5% and 5% of a height of the portable power source.

4. The portable power source of claim 2, wherein the center of gravity is below the horizontal centerline by between 15 mm and 25 mm.

5. The portable power source of claim 1, wherein the portable power source defines a vertical centerline between a first side and an opposite side of the housing, and wherein the center of gravity of the portable power source is toward the first side of the housing from the vertical centerline.

6. The portable power source of claim 5, wherein the center of gravity is spaced from the vertical centerline by between 1.5% and 3% of a depth of the portable power source.

7. The portable power source of claim 5, wherein the center of gravity is spaced from the vertical centerline by between 5 mm and 8 mm.

8. The portable power source of claim 1, wherein the frame further includes
   a first frame portion on a first side of the housing,
   a second frame portion on an opposite side of the housing,
   a pair of bars connected between the first frame portion and the second frame portion, and
   a handle connected between the bars, the handle extending perpendicular to the bars and substantially parallel to the first frame portion and the second frame portion.

9. The portable power source of claim 1, wherein the frame inhibits contact with the housing and the battery power source.

10. The portable power source of claim 1, wherein the portable power source has a total weight between 48 pounds and 55 pounds.

11. The portable power source of claim 1, wherein the portable power source is operable to output a peak power output of between 3000 W and 4000 W for at least 2 seconds and a sustained maximum output power of between about 1500 W and about 2000 W for at least about 6 minutes.

12. The portable power source of claim 1, further comprising a fuel gauge configured to display a state-of-charge of the battery power source, the fuel gauge and the power outlet being positioned on a side of the housing.

13. The portable power source of claim 1, further comprising a battery lock point provided on the battery support, wherein the battery lock point is configured to be engageable with a pad lock to prevent removal of the battery pack.

14. The portable power source of claim 1, wherein the portable power source defines a horizontal centerline, wherein the portable power source defines a vertical centerline between a first side of the housing and an opposite side of the housing, wherein a center of gravity of the portable power source is below the horizontal centerline by between 15 mm and 25 mm, and wherein the center of gravity is spaced from the vertical centerline by between 5 mm and 8 mm.

15. A portable power source comprising:
   a housing having a first surface and a second surface opposite the first surface, the housing including
      a first battery support on the first surface,
      a second battery support on the second surface, and
      a power outlet;
   a circuit supported by the housing and including
      a first input terminal on the first battery support,
      a second input terminal on the second battery support,
      an output terminal on the power outlet, and
      an inverter electrically connected between the input terminal and the output terminal,
   a battery power source supportable on the first battery support and a second battery power source supportable on the second battery support, each battery power source including
      a battery housing supported on the associated battery support,
      a battery cell, and
      a battery terminal connected to the battery cell and electrically connectable to the associated input terminal, wherein power is transferrable from the battery cell of each battery power source to the circuit to be output through the power outlet, and
   a frame connected to the housing and extending beyond a periphery of the housing and the supported first battery power source and the second battery power source.

16. The portable power source of claim 15, wherein the frame further includes
   a first frame portion on a first side of the housing,
   a second frame portion on an opposite side of the housing,
   a pair of bars connected between the first frame portion and the second frame portion, and
   a handle connected between the bars, the handle extending perpendicular to the bars and substantially parallel to the first frame portion and the second frame portion.

17. The portable power source of claim 15, wherein the portable power source is operable to output a peak power output of between 3000 W and 4000 W for at least 2 seconds and a sustained maximum output power of between about 1500 W and about 2000 W for at least about 6 minutes.

18. A portable power source comprising:
   a housing defining a battery support and a power outlet,
   a circuit supported by the housing and including
      an input terminal on the battery support,
      an output terminal on the power outlet, and
      an inverter electrically connected between the input terminal and the output terminal,
   a battery power source having a nominal voltage between 60 Volts (V) and 100 V and including
      a battery housing supported on the battery support,
      a battery cell, and
      a battery terminal connected to the battery cell and electrically connectable to the input terminal, wherein power is transferrable from the battery cell to the circuit to be output through the power outlet, and
   a frame connected to the housing and extending beyond a periphery of the housing and the supported battery power source.

19. The portable power source of claim 18, wherein the frame further includes
   a first frame portion on a first side of the housing,
   a second frame portion on an opposite side of the housing,
   a pair of bars connected between the first frame portion and the second frame portion, and
   a handle connected between the bars, the handle extending perpendicular to the bars and substantially parallel to the first frame portion and the second frame portion.

20. The portable power source of claim 18, wherein the portable power source defines a horizontal centerline, wherein the portable power source defines a vertical centerline between a first side of the housing and an opposite side of the housing, wherein a center of gravity of the portable power source is below the horizontal centerline by between 15 mm and 25 mm, and wherein the center of gravity is spaced from the vertical centerline by between 5 mm and 8 mm.

* * * * *